US012333508B2

(12) United States Patent
Abinavam et al.

(10) Patent No.: US 12,333,508 B2
(45) Date of Patent: Jun. 17, 2025

(54) SYSTEMS AND METHODS FOR UNIFORM, CROSS PLATFORM TRANSACTIONS

(71) Applicant: OPENEDGE PAYMENTS LLC, Atlanta, GA (US)

(72) Inventors: Srinath Abinavam, South Jordan, UT (US); Kuldeep Chowbay, South Jordan, UT (US); Curtis Landry, Draper, UT (US); Lyle Page, Draper, UT (US); Kevin Cook, Ballwin, MO (US)

(73) Assignee: OPENEDGE PAYMENTS LLC, Atlanta, GA (US)

( * ) Notice: Subject to any disclaimer, the term of this patent is extended or adjusted under 35 U.S.C. 154(b) by 97 days.

(21) Appl. No.: 17/763,256

(22) PCT Filed: Sep. 25, 2020

(86) PCT No.: PCT/US2020/052739
§ 371 (c)(1),
(2) Date: Mar. 24, 2022

(87) PCT Pub. No.: WO2021/062165
PCT Pub. Date: Apr. 1, 2021

(65) Prior Publication Data
US 2022/0343297 A1    Oct. 27, 2022

Related U.S. Application Data

(60) Provisional application No. 62/907,536, filed on Sep. 27, 2019.

(51) Int. Cl.
*G06Q 20/08*   (2012.01)
*G06Q 20/34*   (2012.01)

(52) U.S. Cl.
CPC ......... *G06Q 20/085* (2013.01); *G06Q 20/341* (2013.01)

(58) Field of Classification Search
CPC .................................................. G06Q 20/085
See application file for complete search history.

(56) References Cited

U.S. PATENT DOCUMENTS

2013/0138558 A1\* 5/2013 Rannu ................. G06Q 20/322
2014/0351126 A1\* 11/2014 Priebatsch ............. G06Q 20/40
(Continued)

FOREIGN PATENT DOCUMENTS

| CA | 2683239 | \* | 2/1996 | ............. G06Q 40/02 |
| WO | WO 2013/166507 A1 | | 11/2013 | |
| WO | WO 2015/126755 A1 | | 8/2015 | |

OTHER PUBLICATIONS

Cao, et al., in "Cross-Platform App Recommendation by Jointly Modeling Ratings and Texts," from ACM Transactions on Information Systems, vol. 35, No. 4, 2017 (Year: 2017).\*
(Continued)

*Primary Examiner* — Olabode Akintola
*Assistant Examiner* — Brandon M Duck
(74) *Attorney, Agent, or Firm* — Foley & Lardner LLP

(57) ABSTRACT

A cross-platform integration component is configured for operation on a plurality of different types of partner computing devices and/or platforms. The integration component provides a same interface on each different type of computing device. The integration component comprises a plurality of implementation modules, each configured to implement reader-based transactions on a respective type of computing device and/or platform. The integration component may further comprise a platform-independent component capable of implementing non-reader-based transactions across the plurality of platforms.

21 Claims, 11 Drawing Sheets

(56) References Cited

U.S. PATENT DOCUMENTS

2015/0193241 A1 7/2015 Hamzata
2016/0110667 A1 4/2016 Clevenger

OTHER PUBLICATIONS

International Search Report and Written Opinion in PCT/US2020/052739 mailed Jan. 27, 2021 (9 pages).

* cited by examiner

SYSTEMS AND METHODS FOR UNIFORM, CROSS PLATFORM TRANSACTIONS

CROSS REFERENCE TO RELATED APPLICATIONS

The present application is the U.S. national stage entry of International Patent Application PCT/US2020/052739 filed Sep. 25, 2020, which claims priority to U.S. Provisional Patent Application No. 62/907,536 filed Sep. 27, 2019, the entire contents of which are incorporated herein by reference.

TECHNICAL FIELD

This disclosure relates to systems and methods for implementing electronic transactions and, in particular, systems and methods for supporting implementation of a plurality of different types of electronic transactions on a plurality of different platforms (and/or partner devices).

BACKGROUND

A transaction server may provide transaction services to partners. Partners may access transaction services through different types of partner devices. Different types of partner devices may comprise and/or support different computing platforms. As used herein, a "platform" or "computing platform" refers to an operating, execution, and/or runtime environment capable of executing computer-readable code. The transaction server may provide integration components by which partner devices may access transaction services. As used herein, an "integration component" refers to any suitable means for enabling a partner device to access transaction services, including, but not limited to: machine-readable instructions, machine-executable code, machine-interpretable code, a script, JavaScript, a library, an interface, an application program interface (API), a dynamic link library (DLL), a static link library (SLL), and/or the like. The integration components may be incorporated into partner applications, such as point of sale (POS) applications, on-line checkout applications, ecommerce systems, and/or the like.

In some embodiments, the transaction server may support different types of partner devices by use of platform-specific integration components. As used herein, "platform-specific" integration components refer to integration components that are configured for operation on particular types of partner device and/or within particular types of computing platform (and are not configured for operation on other types of partner devices and/or within other types of computing platforms). Supporting different types of partner devices using platform-specific integration components can be complex, inefficient, and error prone; supporting integration of a plurality of different types of partner devices (or platforms) may require the development, testing, maintenance, and distribution of a plurality of different platform-specific integration components, each configured for operation on a respective one of the plurality of different device types (and/or execution within a respective one of the plurality of different platforms). Supporting a new type of partner device (or platform) may require the development, testing, maintenance, and distribution of a new set of platform-specific integration components. Developing each set of platform-specific integration components may involve issues unique to a particular type of partner device; each set of platform-specific integration components may be developed in accordance with the capabilities, constraints, security vulnerabilities, and/or other characteristics of the particular type of partner device. Moreover, each set of platform-specific integration components may define a respective platform-specific transaction interface, which may be configured to provide access to a particular set of transaction services in accordance with the capabilities, constraints, security vulnerabilities, and/or other characteristics of the particular type of partner device. Implementing updates to the platform-specific integration components (e.g., to fix bugs, address security vulnerabilities, provide additional functionality, and/or the like), may require updating each different set of platform-specific integration components (on each different platform), further increasing complexity, inefficiency, and likelihood of error. Platform-specific integration components can also complicate partner-side development. Applications developed for each different type of partner device may require a different set of platform-specific integration components, each of which may define a different platform-specific transaction interface.

In view of the foregoing, what is needed are systems, methods, and computer-readable instructions for integration of a plurality of different types of partner devices by a unified set of integration components (e.g., an integration component configured for integration of each of a plurality of different types of partner devices and/or capable of operating on and/or within a plurality of different platforms). Also needed are systems, methods, and computer-readable instructions for providing a unified transaction interface and/or API across the plurality of different types of partner devices.

SUMMARY

Disclosed herein are embodiments of a transaction platform configured to efficiently implement transactions with a plurality of different types of client computing devices. The disclosed transaction service may be configured to provide client integration components, which may be configured to integrate partner devices with the transaction platform, as disclosed herein. The client integration components may comprise a client library. In some embodiments, the client library may be configured for operation on a plurality of different types of partner devices. The client library may be further configured to operate within a plurality of different computing environments. As used herein, a computing environment refers to any suitable means for executing computer-readable instructions on a computing device including, but not limited to: an operating system, an execution environment, a runtime environment, a virtual execution environment, a virtual machine, a sandbox, a Java runtime environment, a script runtime environment, a JavaScript runtime environment, and/or the like. The computing environment of a partner device may be embodied and/or managed by any suitable means including, but not limited to: a processor, an operating system, a hypervisor, a virtual machine monitor, an application, a browser application, a runtime, a Java runtime, and/or the like. Embodiments of the disclosed client library may, therefore, comprise a cross-platform library capable supporting integration of a plurality of different types of partner devices. The disclosed client library may obviate the need for the development, testing, deployment, and/or maintenance of a plurality of different platform-specific integration components. The disclosed client library may reduce overhead, time requirements, and susceptibility to error relative to conventional, platform-specific client integration libraries.

Embodiments of the client library disclosed herein may be configured to provide a same transaction interface across different types of client devices (and/or client platforms). The client library, may, therefore, comprise a unified, cross-platform transaction library configured to provide access to transaction services across a plurality of different types of client computing devices. Embodiments of the disclosed client library may, therefore, obviate the need for partners to maintain a plurality of different sets of partner components, each set configured for different respective platform-specific integration components.

Disclosed herein are embodiments of a computer-implemented method for servicing transaction requests, comprising: providing a client library configured for operation on a plurality of different types of client computing devices, the client library configured to provide a same transaction interface on each client computing device of the plurality of different types of client computing devices, and servicing transaction requests received through the client library from the different types of client computing devices. Servicing a transaction request may comprise determining a platform type of the client computing device corresponding to the received transaction request, selecting an implementation module at the client computing device based on the determined platform type, the implementation module selected from a plurality of implementation modules, each implementation module configured to implement a first type of transaction on a respective one of the plurality of different types of computing devices, and completing a transaction at the client computing device in accordance with the received transaction request, wherein completing the transaction comprises using the selected implementation module to invoke a platform-specific transaction application on the client computing device. In some embodiments, completing the transaction further comprises configuring a card-reader to process the transaction through a primary connection with a transaction server, establishing a secondary connection with the transaction sever, and acquiring transaction response data through the secondary connection. The client library may be configured for operation within a runtime environment of the client computing device, such as a JavaScript environment. The runtime environment may be managed by one or more of an operating system, a browser application, a hypervisor, and a virtual machine monitor of the client computing device. Selecting the implementation module may comprise selecting a first implementation module in response to the client computing device corresponding to a first platform type, selecting a second implementation module in response to the client computing device corresponding to a second platform type, and selecting a third implementation module in response to the client computing device corresponding to a third platform type. The first platform may be a mobile platform, and the third platform may be a non-mobile platform. Selecting the implementation module may comprise selecting a card-not-present implementation module in response to the determined transition type comprising a card-not-present transaction. The card-not-present implementation module may be selected in response to the determined platform type corresponding to one of an iOS® platform, Android® platform, and a Windows® platform. Completing the transaction with the client computing device may further comprise transmitting electronic markup data to the client computing device, the electronic markup data comprising a form configured to prompt a user to enter electronic data pertaining to the transaction, and obtaining the electronic transaction data in response to submission of the form.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Figure 1:
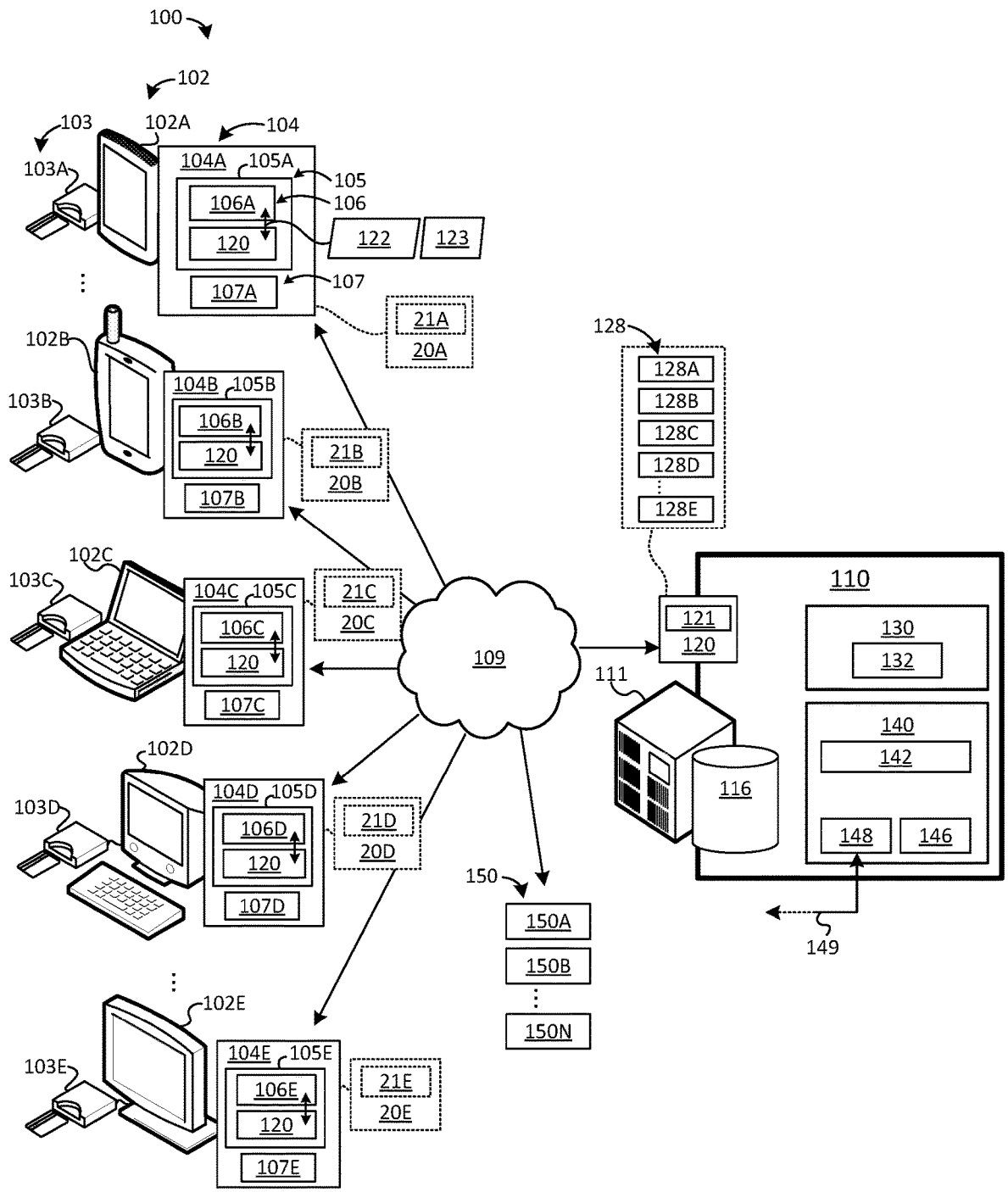
FIG. 1 is a schematic block diagram of one embodiment of a system for efficient, cross-platform transactions, as disclosed herein.

FIG. 1 is a schematic diagram of one embodiment of a system 100 for efficient, cross-platform transactions, as disclosed herein. The system 100 may comprise a transaction server 110. The transaction server 110 may comprise a network-accessible service comprising and/or embodied by one or more computing systems, such as a computing system 111. The computing system 111 may comprise one or more computing devices (e.g., one or more server computing devices, rack mounted computing devices, blade computing devices, clustered computing devices, and/or the like). Portions of the transaction server 110 (and/or services, systems, modules, agents, engines, methods, processes and/or operations disclosed herein) may comprise and/or be embodied by hardware computing resources of the computing system 111, which may include, but are not limited to: processing resources (e.g., a processor, a general-purpose processor, an application-specific processor, an Application-Specific Integrated Circuit (ASIC), a Field Programmable Gate Array (FPGA)), memory resources (e.g., volatile memory resources, random access memory (RAM), dynamic RAM, static RAM, persistent memory, battery-backed RAM, and/or the like), non-transitory storage resources (e.g., a hard drive, solid-state storage device, local storage device, network-attached storage system, and/or the like), network interface resources (e.g., a network interface device, a network interface card, and/or the like), and so on (not shown in FIG. 1 to avoid obscuring details of the illustrated embodiments).

The transaction server 110 may comprise and/or be operatively coupled to a data store 116. The data store 116 may comprise any suitable means for persistently storing, maintaining, manipulating, and/or retrieving electronic and/or computer-readable data, including, but not limited to one or more: storage devices, local storage devices, remote storage devices (e.g., network attached storage devices), hard disk drives, solid-state storage devices, data management systems, databases, and/or the like. As used herein, "data" refers to electronically encoded information corresponding to any suitable format, encoding, representation, and/or structure. In some embodiments, the transaction server 110 (and/or portions thereof) may be embodied as computer-readable instructions stored within the data store 116.

The transaction server 110 may be communicatively coupled to an electronic communication network (network 109). The network 109 may comprise any suitable means for electronic communication, including, but not limited to: an Internet Protocol (IP) network, the Internet, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), a combination of networks, and/or the like.

The transaction server 110 may be configured to provide transaction services to one or more partners. As used herein, "transaction services" may refer to services pertaining to electronic transactions involving a partner, but not limited to: configuring, requesting, implementing, completing, auditing, monitoring, and/or otherwise managing electronic transactions of the partner. A partner may access transaction services through and/or by use of one or more partner devices 102. As used herein, a "partner device" 102 refers to any suitable means for accessing transaction services of the transaction server 110 including, but not limited to: a computing device, a mobile computing device, a client computing device, a server computing device, a POS device, a POS terminal, mobile POS device, an on-line checkout system, an ecommerce system, and/or the like. A partner device 102 may comprise one or more hardware components, such as a processor, memory, non-transitory storage, network interface components, human-machine interface (HMI) components, and/or the like (not shown in FIG. 1 to avoid obscuring details of the illustrated embodiments). A partner device 102 may further comprise software components, such as a partner application 106. The partner application 106 may be configured to utilize transaction services of the transaction server 110, as disclosed herein. The partner application may comprise a POS application, on-line checkout application, ecommerce application, and/or the like.

As illustrated in FIG. 1, a partner device 102 may comprise and/or correspond to a platform 104. As disclosed herein, the platform 104 of a partner device 102 may refer to and operating, execution, and/or runtime environment capable of executing computer-readable code. The platform 104 partner device 102 may correspond to one or more of: processing resources of the partner device 102, an instruction set supported by the partner device 102 (e.g., Complex Instruction Set (CISC), Reduced Instruction Set (RISC), x86, Advanced RISC Machine (ARM), PowerPC), an operating system (OS) of the partner device 102 (e.g., iOS, Android, Windows, Unix, LINUX), an execution and/or runtime environment supported by the partner device 102 (e.g., a Java runtime environment, a JavaScript runtime environment, a virtual machine execution environment), one or more applications operating on the partner device 102 (e.g., a browser application, a hypervisor, a virtual machine monitor), and/or the like. In the FIG. 1 embodiment, the partner device 102A may comprise a mobile iOS® device comprising an iOS® platform 104A; the partner device 102B may comprise a mobile Android® device comprising an Android platform 104B; the partner device 102C may comprise a Windows® terminal device comprising a Windows® platform 104C; the partner device 102D may comprise a desktop device comprising a MacOS® platform 104D; and so on, with the partner device 102M comprising POS terminal comprising a LINUX platform 102M.

In the FIG. 1 embodiment, the partner devices 102A-E may comprise and/or be operably coupled to reader devices 103 (e.g., reader devices 103A-E, respectively). As used herein, a reader device 103 refers to any suitable means for acquiring information pertaining to a transaction, such as information pertaining to transaction payment means (e.g., account information, credit card information, debit card information), transaction authentication means (e.g., a signature, personal identification number, smart card interface), transaction processing means (communication and/or application means for interfacing with a processing system, such as the transaction server 110), and/or the like. A reader device 103 may include, but is not limited to: a card reader, a magnetic card reader, a smart card reader, a communication device, a radio frequency identifier (RFID) reader, a network communication device, a wireless communication device, a near-field communication (NFC) communication device, a Bluetooth® communication device, and/or the like. The partner devices 102A-E may further comprise reader-device transaction (RDT) applications 107, which may be configured to interface with respective reader devices 103 (e.g., RDT applications 107A-E, respectively). An RDT application 107 may be configured for execution within the platform 104 of a particular type of partner device 102 (e.g., may comprise a platform-specific application, card-reader application, driver, controller, and/or the like). In the FIG. 1 embodiment, the RDT application 107A comprises an iOS® mobile application, the RDT application 107B comprises an Android® mobile application, the RDT application 107C comprises a Windows® application, the RDT application 107D comprises a MacOS® desktop application, and the RDT application 107E comprises a LINUX application. The RDT applications 107A-E may be configured to interface with respective reader devices 103A-E (capture transaction information from the reader devices 103), submit the captured transaction information to the transaction server 110 (to the transaction gateway 146, as disclosed in further detail herein), and retrieve transaction response data 126.

In a conventional system, each different type of partner device 102 (and/or platform 104) may access the transaction server 110 by use of a different platform-specific integration component 20. Supporting different types of partner devices 102 using platform-specific integration components 20 may be complex, error-prone, and time-consuming. Each different type partner device 102A-E may require the development, testing, support, distribution, and maintenance of respective platform-specific integration components 20A-E. Each different platform-specific integration component 20A-E may be developed in accordance with the capabilities, constraints, security vulnerabilities, and/or other characteristics of a respective type of partner device 102A-E. The platform-specific integration components 20A-E may implement different platform-specific transaction interfaces 21A-E, each of which may be configured to provide access to a particular set of transaction services in accordance with the capabilities, constraints, and/or other characteristics of the partner device 102A-E. Changes and/or updates may require modifying each of the platform-specific integration components 20A-E (and corresponding platform-specific interfaces 21A-E), further increasing complexity, inefficiency, and likelihood of error. Moreover, the use of different platform-specific integration component 20A-E may increase the integration overhead; partner applications 106A-E operating on different types of partner devices 102A-E may incorporate different platform-specific integration components 20A-E (having different platform-specific transaction interfaces 21A-E), which may further complicate partner integration.

The disclosed transaction server 110 may address these and other deficiencies of prior art systems. In the FIG. 1 embodiment, the transaction server 110 comprises a cross-platform, unified integration (CUI) component 120. The CUI component 120 may comprise and/or be configured to implement a cross-platform unified (CUI) interface 121 for accessing transaction services of the transaction server from a plurality of different types of partner devices 102A-E (and/or a plurality of different platforms 104A-E). The CUI component 120 may comprise a library, machine-readable instructions, machine-executable code, machine-interpretable code, interface, API, protocol, script, JavaScript, DLL, SLL, and/or the like. In some embodiments, the CUI component 120 may be hosted and/or maintained by the transaction server 110 (e.g., may be stored within the data store 116 and/or other non-transitory storage means). The transaction server 110 may be configured to transfer and/or otherwise provide the CUI component 120 to partners and/or partner devices 102. In some embodiments, transaction server 110 provides the CUI component 120 in place of platform-specific integration components 20A-E. Alternatively, or in addition, the transaction server 110 may be configured to support both the CUI component 120 and one or more platform-specific integration components 20A-E (e.g., for integration of legacy devices).

The CUI component 120 may comprise and/or be embodied by cross-platform code configured for operation on a plurality of different types of partner devices 102A-E and/or within a plurality of different platforms 104A-E. The CUI component 120 may be configured for execution within a cross-platform execution environment 105 (e.g., within cross-platform execution environments 105A-E supported by respective partner devices 102A-E and/or platforms 104A-E). The CUI component 120 may be configured to provide access to transaction services of the transaction server 110. The CUI component 120 interface may be configured to provide access to a same CUI interface 121 on each different type of partner device 102A-E (and/or within each different type of platform 104A-E). Updates and/or changes to the transaction services provided by the transaction server 110 may, therefore, involve modifying a single CUI component 120 (and/or a single CUI interface 121), as opposed to a plurality of different platform-specific integration components 20A-E. Moreover, integration with the CUI component 120 may require partners to develop to a single CUI interface 121 (as opposed to a plurality of different platform-specific interfaces 21A-E).

In the FIG. 1 embodiment, the CUI component 120 comprises a JavaScript library configured for execution within a JavaScript execution environment 105 (e.g., within JavaScript execution environments 105A-E of respective partner devices 102A-E). The JavaScript execution environment may comprise and/or be implemented by a Web browser application(s) operating within respective platforms 104A-E of the partner devices 102A-E. Partner applications 106A-E operating on the partner devices 102A-E may comprise Web-based applications (e.g., JavaScript applications). The partner applications 106A-E operating on the different types of partner devices 102A-E may import the same CUI component 120 from the transaction server 110; e.g., using a JavaScript import statement such as "import CUI_JS from 'https://domain.com/CUI.js'," where "CUI_JS" is a name of the CUI component 120 and "domain.com/CUI.js" is a Uniform Resource Identifier (URI) of the CUI component 120 hosted by the transaction server 110. Alternatively, or in addition, the CUI component 120 may be imported and accessed dynamically.

As disclosed above, the CUI component 120 may be configured to uniform interface to partner applications 106 (a CUI interface 121); the CUI interface 121 may comprise a cross-platform, uniform interface (e.g., API) by which partner applications 106A-E operating on a plurality of different types of partner devices 102A-E (and/or within a plurality of different platforms 104A-E) may access transaction services of the transaction server 110. The CUI interface 121 may comprise any suitable interface means (e.g., a library, dynamic library, static library, JavaScript library, and/or the like). In the FIG. 1 embodiment, the CUI component 120 may comprise a JavaScript library and the CUI interface 121 may comprise JavaScript exports, such as exported JavaScript functions, variables, objects, methods, properties, and/or the like. Partner application 106 may interface with the CUI component 120 by importing the CUI component 120 and invoking methods of the CUI interface 121. By non-limiting example, a partner application 106 may invoke a request 122 corresponding to a JavaScript method of the CUI interface 121 by: "CUI.js.mName(reqHeader, reqPayload).then( . . . );" or "CUI.js['mName'] (reqHeader, reqPayload).then( . . . );" where "mName" is the name of a method of CUI interface 121 (a requested transaction type), "reqHeader" comprises a header of the request 122 (request header), and "reqPayload" comprises a payload of the request 122 (a request payload). The request header may comprise any suitable information pertaining to the request 122 including, but not limited to: authentication data, a request identifier, request flags, an interface identifier, and/or the like. Authentication data may comprise any suitable information for authentication of the request 122 and/or request sender, such as the partner and/or partner device 102 (by an authentication module 142, as disclosed in further detail herein) including, but not limited to: an authentication token, a credential, a signature, a password, a ticket, and/or the like. A request identifier may comprise any suitable means for identifying a request 122, such as a name, a distinguished name, an identifier, a unique identifier, a globally unique identifier (GUID), a universally unique identifier (UUID), and/or the like. In some embodiments, the CUI component 120 may export helper methods, such as methods for generating request identifiers (e.g., a "generateRequestId" method). In some embodiments, the request flags may comprise further information pertaining to the request 122, such as a mode in which the request 122 should be implemented (e.g., a debug mode), the mode in which a transaction corresponding to the request 122 should be completed, and/or the like. The request headers may comprise a "hosted_interface" flag indicating whether the request 122 is to be implemented and/or processed through a hosted interface (e.g., a Web interface, such as a Web page, iFrame, pop-out, pop-up, and/or the like). Alternatively, or in addition, the request flags may comprise an "interface_identifier" corresponding to an interface element in which user interface (UI) elements pertaining to the transaction are to be displayed (e.g., a window identifier, an iFrame identifier, and/or the like). Request payload data may comprise any suitable information pertaining to implementation of the request 122 (and/or request transaction), such as a partner identifier (e.g., means by which the transaction server identifies the partner), a device identifier (e.g., an identifier of the partner device 102, device address, device token, device credential), platform data (e.g., information pertaining to the platform 104 of the partner device 102), transaction-related information (e.g., an order identifier, sale identifier, and/or the like), and so on.

The CUI component 120 may be configured to service requests 122 issued through the CUI interface 121. The CUI component 120 may be configured to service requests 122 by use of an interface layer 130 and/or platform layer 140 of the transaction server 110. The platform layer 140 of the transaction server 110 may comprise means for implementing transactions by and/or through one or more transaction processors 150. As used herein, a "transaction processor" 150 refers to any entity configured to process electronic transactions including, but not limited to: a financial institution, a bank, an issuer, a card issuer, a credit card issuer, a bank card issuer, and/or the like (e.g., Visa®, American Express®, CapitalOne®, and/or the like). The platform layer 140 may comprise: an authentication module 142 configured to, inter alia, authenticate requests 122 issued through the CUI component 120; and a transaction gateway 146 configured to process transaction requests with respective transaction processors 150. The transaction gateway 146 may be configured to interface with a plurality of different transaction processors 150A-N through, inter alia, the electronic communication network 109. The authentication module 142 may be configured to implement any suitable authentication mechanism and/or technique including, but not limited to: password-based authentication, application-based authentication, multi-factor authentication, cryptographic authentication, signature-based authentication, and/or the like. In some embodiments, the platform layer 140 further comprises a server module 148 configured to, inter alia, establish secondary transaction connections 149 with CUI components 120 operating on respective partner devices 102, as disclosed in further detail herein.

The integration layer 130 may comprise interface modules (e.g., API) for integrating the CUI component 120 with functionality of the platform layer 140. The interface layer 130 may be configured to process request data, conduct asynchronous server-side requests pertaining to respective requests 122, and so on. The interface layer 130 may comprise a transform module 132, which may be configured to map, transform, and/or otherwise convert data between a CUI format and one or more other, transaction-specific formats (and vice versa). The CUI format may correspond to a data format used by and/or within the CUI component 120; e.g., a format of requests 122 issued to the CUI component 120, request headers, request payloads, and/or the like. As used herein, a "transaction-specific format" refers to a data format used by a particular transaction mechanism, such as a data format used by a reader device 103, an RDT application 107, the transaction gateway 146, a transaction processor 150, and/or the like. A transaction-specific format may comprise one or more of: a mobile format (a format used by reader devices 103 and/or RDT applications 107 of mobile partner devices 102, such as partner devices 102A and 102B), a cloud format (a format used by reader devices 103 and/or RDT applications 107 of non-mobile partner devices 102, such as partner devices 102C-E), an iOS® transaction format (a format used by reader devices 103 and/or RDT applications 107 of iOS® partner devices 102A and/or platforms 102A), an Android® transaction format (a format used by reader devices 103 and/or RDT applications 107 of Android® partner devices 102A and/or platforms 104A), a Windows® transaction format (a format used by reader devices 103 and/or RDT applications 107 of Windows® partner devices 102C and/or platforms 104C), a MacOS® format (a format used by reader devices 103 and/or RDT applications 107 of MacOS® partner devices 102D and/or platforms 104D), a LINUX format (a format used by reader devices 103 and/or RDT applications 107 of LINUX partner devices 102E and/or platforms 104E), a transaction API format (a format used by an transaction and/or configuration API of the transaction server 110 as disclosed in further detail herein in conjunction with FIG. 6), and/or the like.

As disclosed above, the CUI component 120 may be configured to service requests 122 issued through the CUI interface 121. The requests 122 may pertain to transaction methods implemented by the CUI component 120 (requested transaction types), which may include, but are not limited to: "createSale" (create a sales transaction); "getSale" (retrieve a sales transaction); "updateSale" (update a sales transaction); returnSale (create a returns transaction associated with a prior sale); "voidSale" (void a sales transaction); "createAuth" (create an authorizations transaction); "getAuth" (retrieve an authorizations transaction); "updateAuth" (update an authorizations transaction); "captureAuth" (capture an authorizations transaction); voidAuth (void an authorizations transaction); "createCapture" (create an offline captures transaction); "getCapture" (retrieve a captures transaction); "updateCapture" (update a captures transaction); "returnCapture" (create a returns transaction associated with a prior capture); "voidCapture" (void a captures transaction); "createReturn" (create an independent returns transaction); "getReturn" (retrieve a returns transaction); "voidReturn" (void a returns transaction); and so on. Servicing a request 122 may further comprise returning transaction response data 126. The transaction response data 126 may comprise information pertaining to execution of the requested transaction; the transaction response data 126 may indicate whether the transaction completed successfully, was approved, was declined, failed, failed due to a particular error, and/or the like.

In some embodiments, the CUI component 120 may comprise a plurality of transaction processing modules 128. As used herein, a "transaction processing module" (TPM) 128 refers to computer-readable instructions, interfaces, and/or other means for implementing particular types of requests 122 and/or requested transactions. A TPM 128 may incorporate functionality of the transaction server 110 (e.g., functionality of the interface layer 130 and/or platform layer 140), as disclosed herein. In some embodiments, a TPM 128 may specify operations for implementing a particular type of transaction on a particular platform 104 (and/or on a particular type of partner device 102); a 128 may specify operations for implementing a reader-based or card-present transaction on a particular type of partner device 102 (and/or a particular platform 104). A TPM 128 may be may adapted to interface with RDT applications 107 installed on a particular type of partner device 102, and/or configure the RDT applications 107 and/or transaction server 110 to process reader-based transactions. In the FIG. 1 embodiment, the TPM 128A is configured to implement reader-based transactions (e.g., card-present transactions) on iOS® mobile platforms 104A, the TPM 128B is configured to implement reader-based transactions on Android® mobile platforms 104B, the TPM 128C is configured to implement reader-based transactions on Windows® platforms 104C, the TPM 128D is configured to implement reader-based transactions on MacOS® platforms 104D, and the TPM 128E is configured to implement reader-based transactions on LINUX platforms 104E.

Servicing a request 122 may comprise the CUI component 120: a) acquiring platform metadata 123, b) selecting a TPM 128 for the request 122 based on, inter alia, the acquired platform metadata 123, and c) processing the request 122 in accordance with the selected TPM 128. Platform-specific operations involved in servicing the request 122 (if any) may be implemented within the CUI component 120 (by the selected TPM 128 and/or the transaction server 110). The transaction server 110 (and CUI component 120) may, therefore, remove the complexity and overhead associated with supporting transactions on different types of partner devices 102 (and/or different platforms 104); enabling partners to seamlessly support transactions across a plurality of different types of partner devices 102A-E (and/or different platforms 104A-E) without the complexity, inefficiency, and potential for error associated with partner integration with different platform-specific integration components 20A-E (and/or platform-specific interfaces 21A-E).

As disclosed above, the CUI component 120 may be configured to select TPM 128 for requests 122 based on platform metadata 123. The platform metadata 123 may comprise information pertaining to the partner device 102 and/or platform 104 on which the CUI component 120 is operating (and/or the partner device 102 and/or platform 104 from which the request 122 was issued). The platform metadata 123 may also be referred to herein as customization metadata. The platform metadata 123 may identify the operating system of the partner device 102, identify the execution environment in which the CUI component 120 is deployed (e.g., specify the browser and/or user agent associated with a JavaScript execution environment), and/or the like. In some embodiments, the platform metadata 123 may comprise information pertaining to capabilities of the partner device 102, such as whether the partner device 102 comprises a reader device 103 and/or an RDT application 107. The CUI component 120 may be configured to select the iOS® TPM 128A for requests 122 issued on iOS® mobile partner devices 102A; may select the Android® TPM 128B for requests 122 issued on Android® mobile partner devices 102B; select the Windows® TPM 128C for requests 122 issued on Windows® partner devices 102C; select the MacOS® TPM 128D for requests issued on MacOS® partner devices 102D; select the LINUX TPM 128E for requests issued on LINUX partner devices 102E; and so on. In some embodiments, the selection is further based on the request 122 itself, such as the requested transaction type, request header(s), the request payload, and/or the like.

Figure 2A:
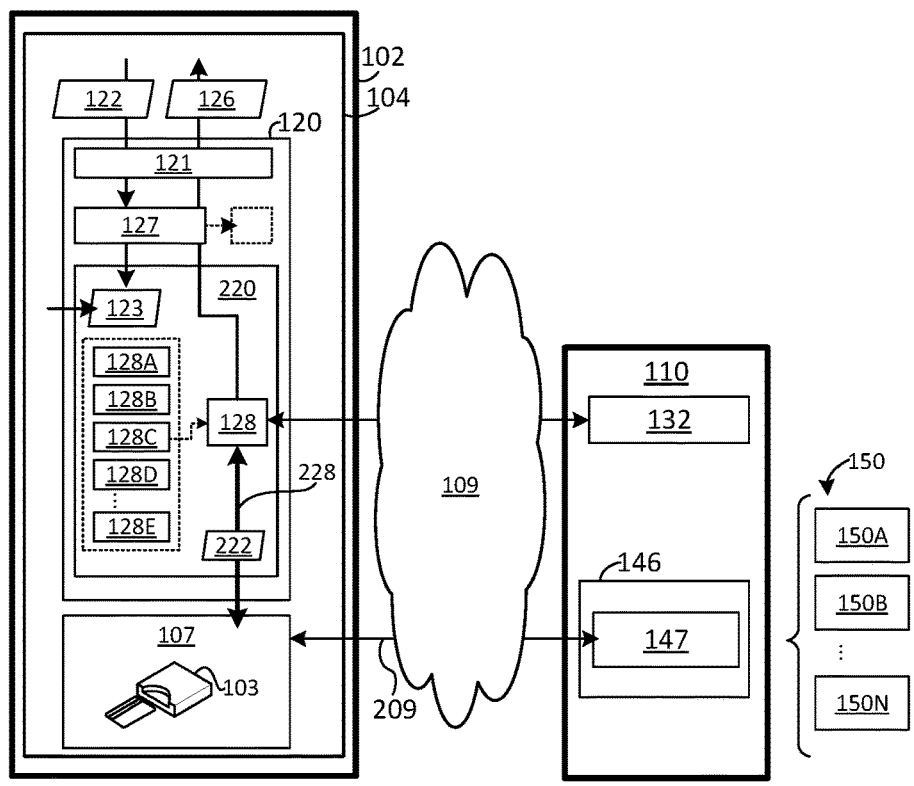
FIG. 2A is a schematic block diagram illustrating further embodiments of a cross-platform, unified integration component, as disclosed herein.

FIG. 2A is a schematic block diagram illustrating further embodiments of the disclosed CUI component 120. In the FIG. 2A embodiment, the CUI component 120 comprises a plurality of TPM 128A-E, each configured to implement reader-based transactions on a particular type of partner device 102A-E and/or on a particular platform 104A-E; the TPM 128A-E may be configured to interface with respective, platform-specific RDT applications 107A-E installed on respective types of partner devices 102A-E and/or platforms 104A-E, as disclosed herein.

The CUI component 120 may further comprise a request processor 127, which may be configured to parse, interpret, extract, and/or process requests 122, request headers, and/or request payloads. The request processor 127 may be configured to determine transaction types of respective requests 122 (and/or the transaction type of a request 122 may be determined in accordance with the particular transaction method through which the request 122 was received). In some embodiments, the request processor 127 is further configured to generate additional request headers, such as an "abort_controller" (for use in aborting operations associated with the request 122), a "request_start_time" (a timestamp indicating a start time of the request 122, which may be used to abort the request 122 after a determined time period), a "transaction_timer" (a timer configured to track a processing time of the request 122, and which may be used to abort requests 122 that do not complete within a time threshold), and/or the like. The request processor 127 may be further configured to parse a payload and/or body of a request 122, which may comprise converting the payload from a first format (e.g., a string format) to a second format (e.g., an object format, such as a JavaScript object).

The request processor 127 may be configured to identify requests 122 that pertain to reader-based transactions, and to forward the identified requests 122 to a cross-platform transaction processing (CPT) engine 220 of the CUI component 120. Other requests 122 determined to pertain other operations and/or transaction types may be forwarded to other modules of the CUI component 120 (not shown in FIG. 2A to avoid obscuring details of the illustrated embodiments). The CPT engine 220 may comprise cross-platform, computer-readable instructions configured for execution on a plurality of different types of partner devices 102A-E and/or on a plurality of different platforms 104A-E. The CPT engine 220 may be configured to implement reader-based transactions with the transaction server 110 on a different types of partner devices 102A-E (and/or a plurality of different platforms 104A-E). Servicing a request 122 to implement a reader-based transaction may comprise the CPT engine 220: acquiring platform metadata 123, selecting a TPM 128 from a plurality of TPM 128A-E based on the acquired platform metadata 123, and processing a reader-based transaction of the request 122 in accordance with the selected TPM 128. Processing the reader-based transaction may further comprise acquiring transaction response data 126 and returning the transaction response data 126 in response to the request 122.

The CPT engine 220 may be configured to process the requested transaction using an RDT application 107 installed on the partner device 102. The processing may, therefore, comprise interfacing with the RDT application 107 in accordance with the selected TPM 128. The interfacing may comprise launching, instantiating, loading, running, and/or invoking the RDT application 107 on the partner device 102. Alternatively, or in addition, the interfacing may comprise configuring the RDT application 107 to implement particular function(s) and/or method(s); e.g., may comprise invoking the particular function(s) and/or method(s) of the RDT application 107. The CPT engine 220 generate a platform-specific device request in accordance with the selected TPM 128 (a device request 222). The device request 222 may be adapted to configure the RDT application 107 to process the requested transaction. The device request 222 may be generated by use of the transform module 132 of the transaction server 110. Generating a device request 222 may comprise configuring the transform module 132 to convert data of the request 122 from a CUI format to a transaction-specific format (e.g., a format used by the selected TPM 128, corresponding RDT application 107, and/or reader device 103, as disclosed herein). The device request 222 may comprise a transaction-specific transaction type 223, request headers 224, and/or request payload 225. Configuring the RDT application 107 to process the requested, reader-based transaction may comprise issuing the device request 222 to the RDT application 107 and/or reader device 103 (e.g., invoking the RDT application 107 and/or reader device 103).

The RDT application 107 may be configured to process the requested, reader-based transaction in accordance with the device request 222 generated by the CUI component 120. The RDT application 107 may be configured to process the requested transaction through a dedicated transaction processing interface of the transaction gateway 146 (a direct to gateway (DTG) interface 147). The RDT application 107 may be configured to establish a connection to the DTG interface 147 of the transaction gateway 146 through the electronic communication network 109 (establish a primary transaction connection 209). The transaction gateway 146 may be configured to: acquire transaction-related data from the RDT application 107 (and/or reader device 103) through the primary transaction connection 209; process the requested transaction through a selected transaction processor 150; and return a corresponding transaction response data 126 to the RDT application 107 (through the primary transaction connection 209).

As disclosed above, each TPM 128A-E may be configured to interface with a respective RDT application 107A-E through platform-specific interface and/or invocation mechanisms. The TPM 128C-E configured for operation on non-mobile, desktop, and/or terminal partner devices 102C-E (non-mobile platforms 104C-E) may be capable of establishing bi-directional interfaces 228 with respective RDT applications 107C-E. As used herein, a "bi-directional" interface 228 refers to an interface and/or invocation mechanism through which the corresponding RDT application 107 may return information to the CUI component 120 (e.g., return transaction response data 126). In the FIG. 2A embodiment, the partner device 102 may comprise a non-mobile platform 104 (e.g., may comprise a Windows® platform 104C). The selected TPM 128 may, therefore, comprise a Windows® platform TPM 128C. As illustrated in FIG. 2A, the non-mobile TPM 128 may be configured to service requests 122 pertaining to reader-based transactions by: a) generating device requests 222 for the requested reader-based transactions, b) invoking the RDT application 107 through a bi-directional interface 228, and c) acquiring corresponding transaction response data 126 through the bi-directional interface 228.

Figure 2B:
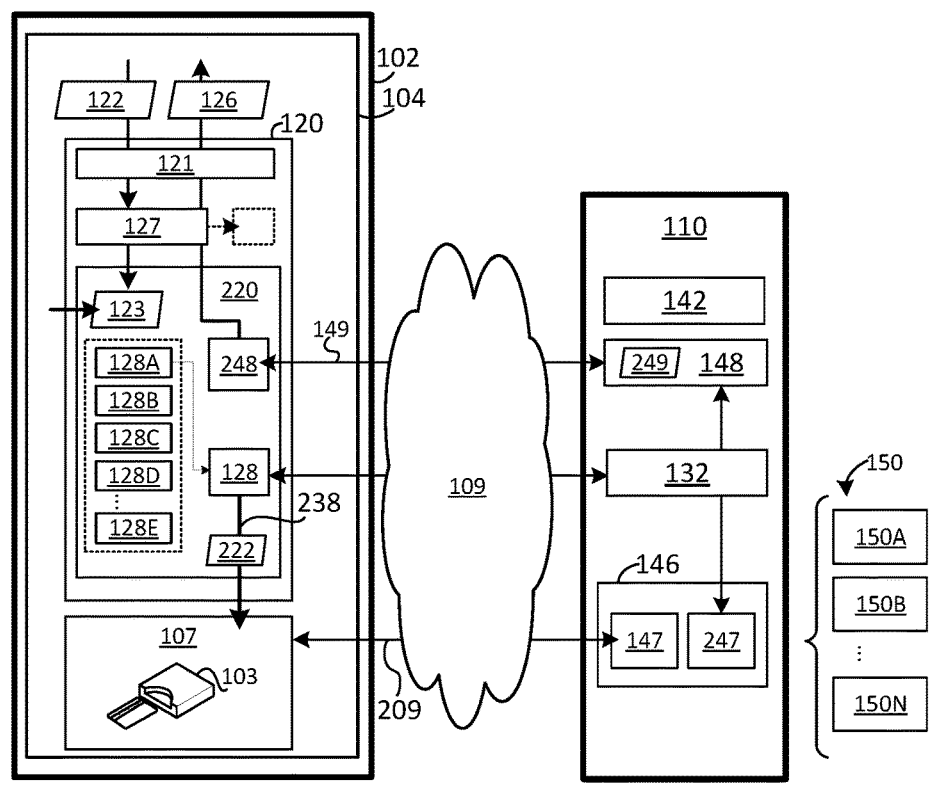
FIG. 2B is a schematic block diagram illustrating further embodiments of a cross-platform, unified integration component, as disclosed herein.

FIG. 2B is a schematic block diagram of further embodiments of the disclosed CUI component 120. In the FIG. 2B embodiment, the CUI component 120 may be deployed on a mobile platform 104, such as a mobile iOS® platform 104A, Android® platform 104B, and/or the like. Accordingly, in the FIG. 2B embodiment, the CPT engine 220 may select a mobile TPM 128 to service requests 122 pertaining to reader-based transactions (e.g., select an iOS® platform TPM 128A). The mobile TPM 128 may be configured to interface with the RDT application 107 through a unidirectional interface 238. As used herein, a "unidirectional interface" 238 refers to an interface and/or invocation mechanism through which the corresponding RDT application 107 is incapable of returning information to the CUI component 120 (e.g., incapable of returning transaction response data 126 directly to the CUI component 120). In the FIG. 2B embodiment, processing a request 122 pertaining to a reader-based transaction may comprise: a) generating a device request 222 adapted to configure the RDT application 107 associated with the selected mobile TPM 128 to implement the requested, reader-based transaction through a primary transaction connection 209 to the transaction server 110 (e.g., using the translation module 132 of the transaction server 110 to convert data of the request 122 from a CUI format into a transaction-specific format associated with the selected mobile TPM 128, as disclosed herein); b) establishing a secondary transaction connection 149 with the server module 148 of the transaction server 110 for the transaction; c) invoking the RDT application 107 through a unidirectional interface 238 (with the generated device request 222); and d) retrieving transaction response data 126 corresponding to the transaction through the secondary transaction connection 149. The secondary transaction connection 149 may comprise any suitable connection means utilizing any suitable protocol and/or communication mechanism. In some embodiments, the secondary transaction connection 149 comprises a bi-directional and/or duplex connection, such as a WebSocket connection or the like.

The secondary transaction connection 149 may be separate from and/or independent of the primary transaction connection 209 used to perform the requested transaction between the transaction gateway 146 and the RDT application 107 (and/or reader 103). The CUI component 120 may comprise a connection agent 248 configured to manage secondary transaction connections 149 for respective transaction requests 122, as disclosed herein. Establishing the secondary transaction connection 149 for a requested transaction may comprise generating an identifier and/or key for the requested transaction (a transaction-specific identifier 249). The transaction-specific identifier 249 may comprise and/or be derived from information pertaining to the requested transaction; e.g., may be derived from the device request 222 generated for the requested transaction. The transaction-specific identifier 249 may comprise and/or be derived from any suitable transaction-related information including, but not limited to: a transaction identifier (e.g., an order identifier), a transaction type identifier (e.g., an identifier corresponding with the requested transaction type), an identifier of the partner device 102 (e.g., a device identifier, such as a media access control (MAC) address, a device token, a device credential, and/or the like), and so on. In some embodiments, the transaction-specific identifier 249 comprises a Uniform Resource Locator (URL) or URI (e.g., may comprise a combination of a base URL and a transaction-specific identifier 249).

Establishing the secondary transaction connection 149 may further comprise sending a connection request to the server module 148 of the transaction server 110, the connection request comprising the transaction-specific identifier 249 (and/or being directed to a URL comprising the transaction-specific identifier 249). The server module 148 may be configured to open the secondary transaction connection 149 and associate the secondary transaction connection 149 with the specified transaction-specific identifier 249 (e.g., establish the secondary connection 149 at a transaction-specific URL). The server module 148 may be further configured to authenticate the connection request by use of the authentication module 142, as disclosed herein. The server module 148 may transmit a confirmation message to the CUI component 120 in response to establishing and/or authenticating the secondary transaction connection 149 (e.g., transmit an HTTP Authentication Succeeded message to the connection manager 248).

The CUI component 120 may invoke the RDT application 107 in response to establishing the secondary transaction connection 149 (e.g., the CUI component 120 may not invoke the RDT application 107 until the secondary transaction connection 149 is established and/or authenticated). Invoking the RDT application 107 may comprise configuring the RDT application 107 to process the requested transaction with the transaction gateway 146 over a primary transaction connection 209, as disclosed herein. The server module 148 may be configured to acquire transaction response data 126 for the requested transaction and transmit the acquired transaction response data 126 to the CUI component 120 through the secondary transaction connection 149. The CUI component 120 may receive the transaction response data 126 through the secondary transaction connection 149. Receiving the transaction response data 126 may comprise monitoring the secondary transaction connection 149, registering event listeners with the secondary transaction connection 149 (e.g., register an open, message, error, and/or close event listeners), and so on. The connection agent 248 may be configured to terminate the secondary transaction connection 149 in response to an abort signal, expiration of a request timer, error conditions, and/or the like. The CUI component 120 may be configured to return the transaction response data 126 in response to the request 122, as disclosed herein. The connection agent 248 may be configured to close the secondary transaction connection 149 in response to receiving the transaction response data 126 (or the secondary transaction connection 149 may be closed by the server module 148 in response to sending the transaction response data 126 to the CUI component 120).

The server module 148 may acquire transaction response data 126 corresponding to the requested transaction from the transaction gateway 146. The server module 148 may be configured to identify transaction response data 126 corresponding to the requested transaction and return the identified transaction response data 126 to the CUI component 120 through the secondary transaction connection 149. In some embodiments, acquiring the transaction response data 126 comprises monitoring the transaction gateway 146. The monitoring may comprise comparing the transaction-specific identifier 249 with transaction requests being processed at the transaction gateway 146. The monitoring may comprise extracting transaction-specific information from the transaction-specific identifier 249 and comparing the extracted transaction-specific information to the transaction requests. In some embodiments, the transaction gateway 146 comprises a transaction monitor 247. The server module 148 may be configured to register the transaction-specific identifier 249 with the transaction monitor 247, which may use the transaction-specific identifier 249 to monitor transaction requests at the transaction gateway 146, identify transaction response data 126 corresponding to the registered transaction-specific identifier 249, and provide the identified transaction response data 126 to the server module 148.

Figure 3:
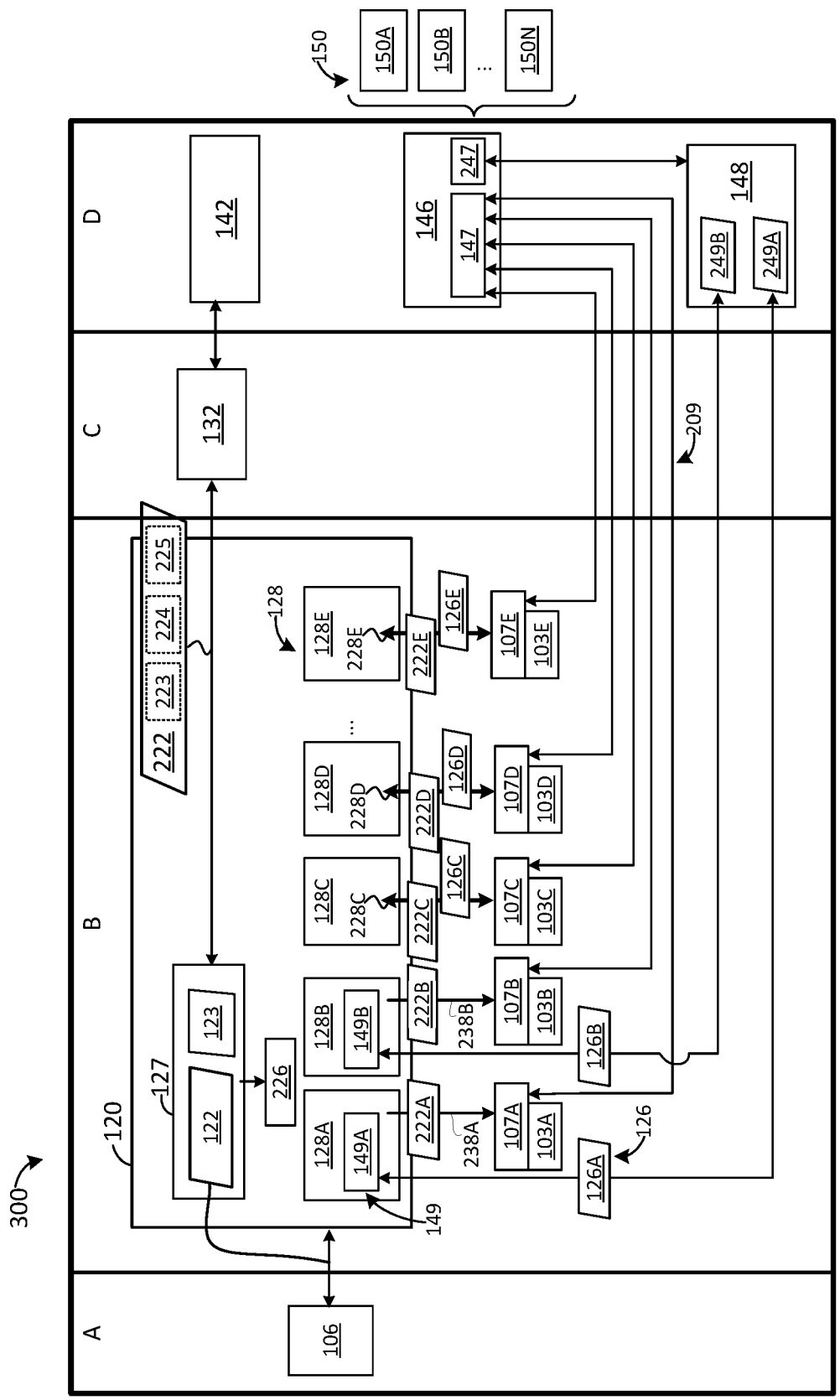
FIG. 3 is an interaction diagram illustrating embodiments of the disclosed transaction server.

FIG. 3 is a schematic interaction diagram 300 illustrating further embodiments of the disclosed transaction server 110 and/or CUI component 120. The interaction diagram 300 comprises sections A-D: section A illustrates operations implemented by a partner application 106, section B illustrates operations implemented by the CUI component 120 (at a partner device 102 and/or within a particular platform 104), section C illustrates operations implemented by and/or within the integration layer 130 of the transaction server 110, and section D illustrates operations implemented by and/or within the platform layer 140 of the transaction server 110. In the FIG. 3 embodiment, the partner application 106 may issue transaction requests 122, which may comprise: a) importing the CUI component 120, and b) issuing requests 122 through the imported CUI interface 121, as disclosed herein. Issuing a request 122 may comprise the partner application 106 forming request headers and/or a request payload for a requested transaction type. The request headers and/or request payload may be generated by use of helper functions of the CUI component 120 (e.g., a generateRequestId function, and/or the like).

The CUI component 120 may receive requests 122 from the partner application 106 through the CUI interface 121. The CUI component 120 may be configured to service the requests 122, as disclosed herein. Servicing a request 122 may comprise: a) acquiring platform metadata 123, b) selecting a TPM 128 for the request 122 from a plurality of TPM 128A-E, c) servicing the request 122 in accordance with the selected TPM 128, d) acquiring transaction response data 126 corresponding to the request 122, and e) returning the transaction response data 126 in response to the request 122.

In the FIG. 3 embodiment, the CUI component 120 may comprise a request processor 127, which may be configured to parse, interpret, extract, and/or process requests 122, request headers, and/or request payloads, as disclosed herein. The request processor 127 may be further configured to acquire platform metadata 123 corresponding to the requests 122 and/or define additional request headers for the requests 122, as disclosed herein.

The CUI component 120 may further comprise a selection module 226, which may be configured to select TPM 128 for respective requests 122. The selection may be based on the acquired platform metadata 123, as disclosed herein. Alternatively, or in addition, the selection may be based on requested transaction types of the requests 122. In the FIG. 3 embodiment, the CUI component 120 comprises TPM 128A-E, which may be configured to implement reader-based transactions (e.g., card present transactions) on respective platforms 104A-E. As disclosed above, the TPM 128A-E may be configured to implement reader-based transactions on mobile iOS® platforms 104A, mobile Android® platforms 104B, Windows® platforms 104C, MacOS® platforms 104D, and LINUX platforms 104E, respectively. Servicing a request 122 to implement a requested, reader-based transaction may comprise: a) selecting a TPM 128 for the request 122; b) processing the requested, reader-based transaction of the request 122 in accordance with the selected TPM 128. Processing the requested transaction may comprise configuring the RDT application 107 associated with the selected TPM 128 to perform the requested transaction, which may include generating a device request 222 for the requested transaction by use of the transform module 132. Generating the device request 222 may comprise configuring the transform module 132 to convert data of the request 122 from a CUI format to a transaction-specific format, as disclosed herein. As illustrated in FIG. 3, the device request 222 generated for a request 122 may comprise a transaction-specific transaction type 223, headers 224, and/or payload 225. The device request 222 may be generated in accordance with the selected TPM 128 (e.g., for the corresponding platform-specific RDP application 107 and/or reader device 103): device requests 222A generated for TPM 128A may be adapted for a mobile iOS® RDT application 107A (and/or reader device 103A); device requests 222B generated for TPM 128B may be adapted for a mobile Android® RDT application 107B (and/or reader device 103B); device requests 222C generated for TPM 128C may be adapted for a Windows® RDT application 107C (and/or reader device 103C); device requests 222D generated for TPM 128D may be adapted for a MacOS® RDT application 107D (and/or reader device 103D); device requests 222E generated for TPM 128E may be adapted for a LINUX RDT application 107E; and so on. The RDT applications 107 and/or transaction processing engine may be configured to return response data in a transaction-specific format. The CUI component 120 may be configured to convert the transaction-specific response data to a CUI format by use of the transform module 132, as disclosed herein (transaction-specific response data not shown in FIG. 3 to avoid obscuring details of the illustrated embodiments).

Processing a transaction of a request 122 in accordance with a selected TPM 128 may comprise: a) generating a device request 222; and b) configuring the platform-specific RDT application 107 of the TPM 128 to implement the device request 222. The configuring may comprise invoking the RDT application 107 using a platform-specific invocation mechanism. TPM 128 adapted for non-mobile platforms 104, such as the Windows® platform TPM 128C, the MacOS® platform TPM 128D, and the LINUX platform TPM 128E, may be configured to interface with RDT applications 107C-E through platform-specific, bi-directional interfaces 228C-E. The RDT applications 107C-E may be configured to return transaction response data 126C-E to the CUI component 120 through the respective bi-directional interfaces 228C-E, as disclosed herein.

TPM 128 adapted for mobile platforms 104 (mobile TPM 128 such as the iOS® mobile platform TPM 128A and the Android® mobile platform TPM 128B) may be configured to invoke mobile RDT applications 107 through unidirectional interfaces 238. In the FIG. 3 embodiment, the TPM 128A may be configured to invoke an RDT application 107A installed on an iOS® partner device 102A through a unidirectional mobile deep link interface 238A "RDT_app_A:// 'RDT_req_A'" where "RDT_app_A" is an identifier associated with the installed RDT application 107A (e.g., a URI of the RDT application 107A) and "RDT_req_A" comprises the device request 222A generated for the TPM 128A (and/or portions thereof); the TPM 128B may be configured to invoke an RDT application 107B installed on an Android® partner device 102B by a unidirectional mobile deep link interface 238B "RDT_app_B://'RDT_req_B'" where "RDT_app_B" is an identifier associated with the installed RDT application 107B and "RDT_req_B" comprises the device request 222B generated for the TPM 128B (and/or portions thereof); and so on.

As disclosed above, RDT applications 107 invoked through unidirectional interfaces 238 may be incapable of returning transaction response data 126 directly to the CUI component 120. Accordingly, processing a request 122 using a TPM 128 configured to interface with a RDT application 107 through a unidirectional interface 238 (e.g., a mobile TPM 128) may comprise: a) generating a device request 222 for the RDT application 107, b) deriving a transaction-specific identifier 249 from the generated device request 222, c) establishing a secondary transaction connection 149 corresponding to the transaction-specific identifier 249 with the server module 148 of the transaction server 110, d) invoking the RDT application 107 in response to establishing the connection, the invoking to configure the RDT application 107 to process the requested transaction through a primary transaction connection 209, e) receiving transaction response data 126 corresponding to the requested transaction through the secondary transaction connection 149. The processing may further comprise the server module 148 acquiring transaction response data 126 corresponding to the requested transaction from the transaction gateway 146 and transmitting the transaction response data 126 to the CUI component 120 via the secondary transaction connection 149, as disclosed herein. The CUI component 120 may be further configured to return the transaction response data 126 in response to the request 122 and close the secondary transaction connection 149, as disclosed herein.

As illustrated in FIG. 3, servicing a request 122 to process a reader-based transaction on an iOS® mobile partner device 102A may comprise: a) selecting the TPM 128A, b) generating a device request 222A, c) deriving a transaction-specific identifier 249A from the device request 222A, d) establishing a secondary transaction connection 149A corresponding to the transaction-specific identifier 249A, e) configuring a mobile iOS® RDT application 107A to process the requested transaction over a primary transaction connection 209 (through a unidirectional interface 238A), and f) receiving corresponding transaction response data 126A through the secondary transaction connection 149A. Servicing a request 122 to process a reader-based transaction on an Android® mobile partner device 102A may comprise: a) selecting the TPM 128B, b) generating a device request 222B, c) deriving a transaction-specific identifier 249B from the device request 222B, d) establishing a secondary transaction connection 149B corresponding to the transaction-specific identifier 249B, e) configuring a mobile Android® RDT application 107B to process the requested transaction over a primary transaction connection 209 (through a unidirectional interface 238B), and f) receiving corresponding transaction response data 126B through the secondary transaction connection 149B. Processing the requests 122 may further comprise the server module 148: a) establishing and/or authenticating the secondary transaction connection 149A and 149B corresponding to transaction-specific identifiers 249A and 249B, respectively, b) acquiring transaction response data 126A and 126B corresponding to the respective transaction-specific identifiers 249A and 249B, and c)

transmitting the acquired transaction response data 126A and 126B over respective secondary transaction connections 149A and 149B.

Figure 4:
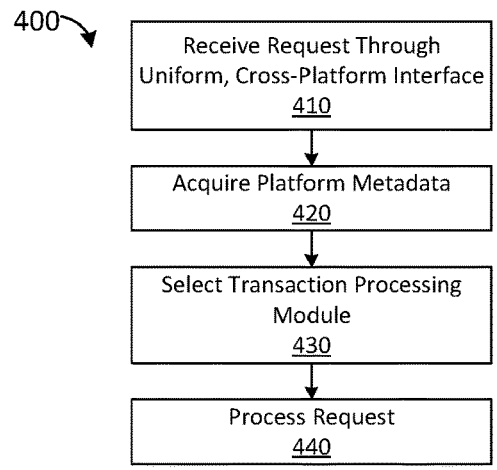
FIG. 4 is a flow diagram of one embodiment of a method for supporting a uniform, cross-platform transaction interface.

FIG. 4 is a flow diagram of one embodiment of a method 400 for uniform, cross-platform transaction integration. In some embodiments, the method 400, and other methods and/or processes disclosed herein, may be embodied as one or more computer- and/or machine-readable instructions stored on a non-transitory storage medium, such as a disk, optical media, non-volatile memory, solid-state memory (e.g., Flash memory), EEPROM, or the like (e.g., the non-transitory data store 116 of FIG. 1). Alternatively, or in addition, steps of the methods and/or processes disclosed herein may be implemented using machine components, such as a processor, memory, communication interface, and the like.

Step 410 may comprise receiving a request 122 from a partner application 106 operating on a partner device 102. The request 122 may be received at a CUI component 120 operating on the partner device 102 (e.g., through a CUI interface 121 of the CUI component 120). Step 410 may, therefore, comprise providing a CUI component 120 capable of operation on a plurality of different types of partner devices 102A-E or different platforms 104A-E, as disclosed herein. The CUI component 120 of step 410 may comprise a plurality of TPM 128A-E, each configured to process transactions on a respective type of partner device 102A-E and/or platform 104A-E. Step 410 may further comprise hosting the CUI component 120 and/or transferring the CUI component 120 to the partner device 102.

Step 420 may comprise acquiring platform metadata 123 pertaining to the partner device 102. Step 410 may comprise identifying an operating system of the partner device 102, identifying an execution environment in which the CUI component 120 is deployed (e.g., a cross-platform execution environment 105), determining capabilities of the partner device 102 (e.g., determining whether the partner device 102 comprises a reader device 103, RDT application 107, and/or the like), and so on. The platform metadata 123 may be acquired by the CUI component 120, as disclosed herein.

Step 430 may comprise selecting a TPM 128 from a plurality of TPM 128A-E. Step 430 may comprise selecting the TPM 128 based on the platform metadata 123 acquired at step 420, as disclosed herein.

Step 440 may comprise processing the request 122. Step 440 may comprise processing the request 122 in accordance with and/or using the selected TPM 128 (the TPM 128 selected at step 430). Step 440 may comprise: a) generating a device request 222, b) configuring a platform-specific RDT application 107 associated with the selected TPM to implement the generated device request 222 over a primary transaction connection 209 with a transaction server 110 (a primary transaction connection 209 to a transaction gateway 146 of the transaction server 110). In some embodiments, step 440 comprises invoking the RDT application 107 through a bi-directional interface 228 and retrieving corresponding transaction response data 107 from the RDT application 107 through the bi-directional interface 228. In other embodiments, step 440 comprises invoking the RDT application 107 through a unidirectional interface 238. In these embodiments, step 440 may comprise: a) generating the device request 222, b) deriving a transaction-specific identifier 249 from the device request 222, c) establishing a secondary transaction connection 149 corresponding to the transaction-specific identifier 249 with the transaction server 110 (a secondary transaction connection 149 to a server module 148 of the transaction server 110), d) invoking the RDT application 107 through the unidirectional interface 238, e) and receiving transaction response data 126 corresponding to the requested transaction through the secondary transaction connection 149.

Figure 5:
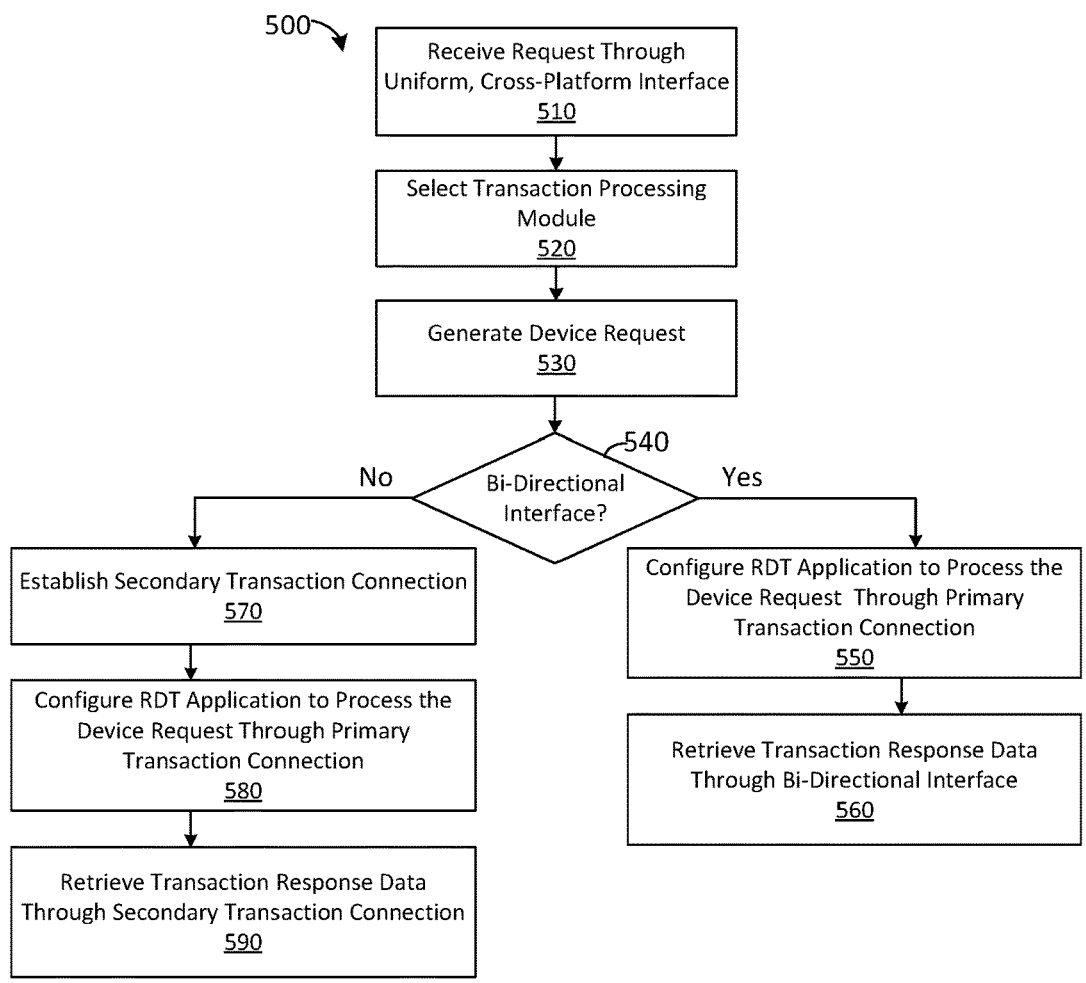
FIG. 5 is a flow diagram of another embodiment of a method for supporting a uniform, cross-platform transaction interface.

FIG. 5 is a flow diagram of another embodiment of a method 500 for uniform, cross-platform transaction integration, as disclosed herein. Step 510 may comprise receiving a request 122 through a CUI interface 121 of a CUI component 120, and step 520 may comprise selecting a TPM 128 for the request 122, as disclosed herein. Step 530 may comprise generating a device request 222 in accordance with the selected TPM 128. Step 530 may comprise using a transform module 132 of the transaction server 110 to convert data of the request 122 from a CUI format to a transaction-specific format associated with the TPM 128. The device request 222 may comprise a transaction-specific transaction type 223, header 224, and/or payload 225. The device request 222 may be adapted to configure the platform-specific RDT application 107 associated with the selected TPM 128 to process a requested transaction.

Step 540 may comprise determining whether the selected TPM 128 is configured to interface with the platform-specific RDT application 107 through a bi-directional interface 228. If so, the flow may continue at step 550; otherwise, the flow may continue at step 570. Step 550 may comprise configuring the RDT application 550 to process the device request 222 with the transaction server 110 through a primary transaction connection 209. Step 560 may comprise retrieving corresponding transaction response data 126 from the RDT application 107 (through the bi-directional interface 228) and/or returning the transaction response data 126 in in response to the request 122.

Step 570 may comprise establishing a secondary transaction connection 149 with the transaction server 110 (with the server module 148 of the transaction server 110). Step 570 may comprise producing a transaction-specific identifier 249, configuring the server module 148 to associate the secondary transaction connection 149 with the transaction-specific identifier 249 (or establish the secondary transaction connection 149 at a URL comprising the transaction-specific identifier 249), and to acquire transaction completion data 126 from the transaction gateway 146 corresponding to the requested transaction, as disclosed herein. Step 580 may comprise configuring the RDT application to process the device request 222 through a primary transaction connection 209. Step 590 may comprise receiving transaction response data 126 corresponding to the requested transaction through the secondary transaction connection 149. Step 590 may comprise monitoring the secondary transaction connection 149, registering one or more connection listeners with the secondary transaction connection 149, and/or the like. The server module 148 may be configured to transmit the transaction response data 126 through the secondary transaction connection 149 in response to identifying a transaction and/or transaction response data 126 at the transaction gateway 146, as disclosed herein. Step 590 may further comprise closing the secondary transaction connection 149 in response to receiving the transaction completion data 126.

Figure 6:
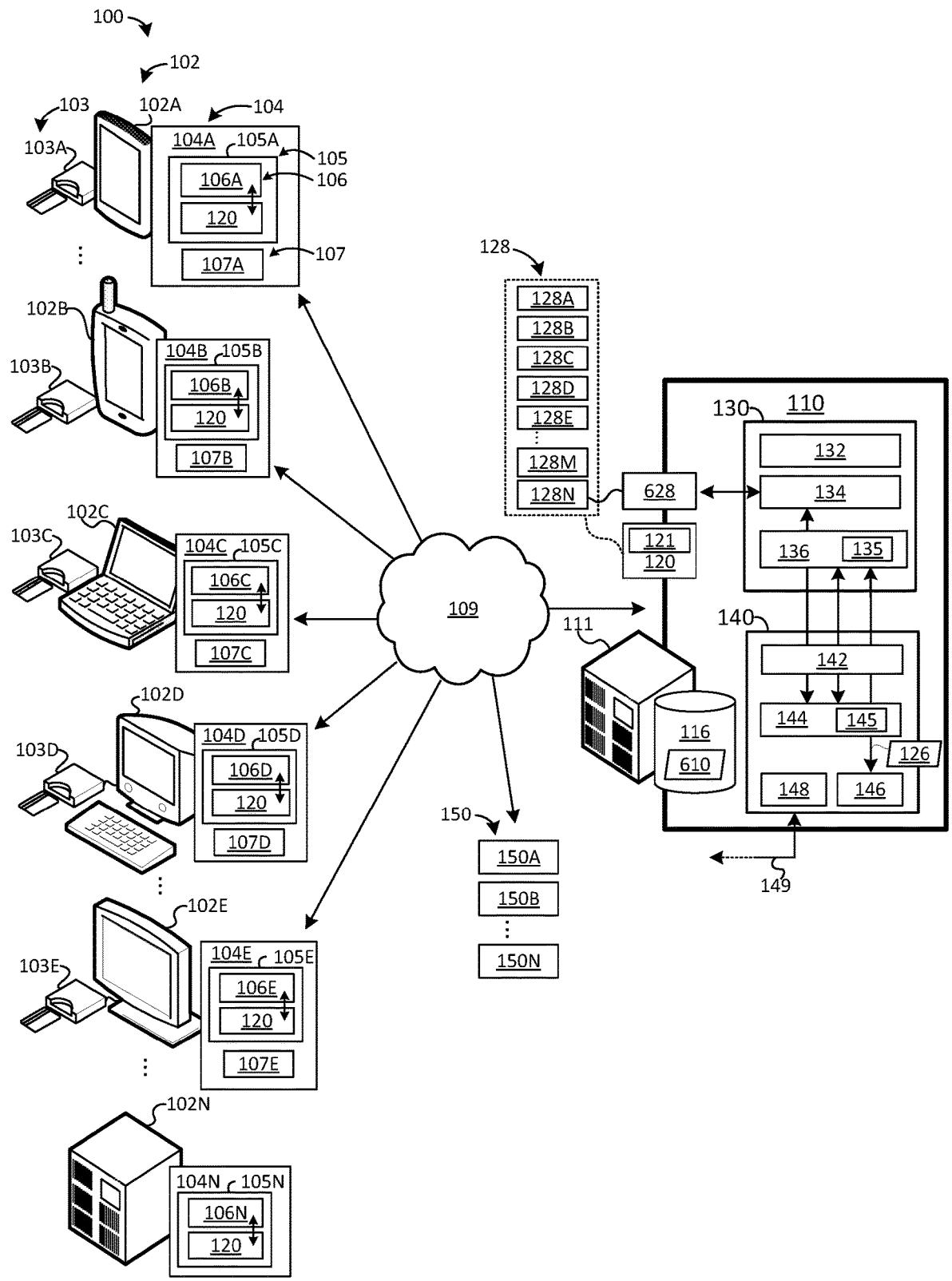
FIG. 6 is a schematic block diagram illustrating another embodiment of a system for efficient, cross-platform transactions, as disclosed herein.

FIG. 6 is a schematic block diagram of another embodiment of a system 100 for efficient, cross-platform transactions, as disclosed herein. The system 100 may comprise a transaction server 110, which may be configured to support uniform, cross-platform transactions on a plurality of different types of partner devices 102A-N (and/or a plurality of platforms 104A-N), as disclosed herein. In the FIG. 6 embodiment, the transaction server 110 further comprises a transaction API 136 configured to implement and/or process non-reader transactions. As used herein, a "non-reader" (NR) transaction refers to a transaction that is capable of being implemented and/or processed without interfacing with a reader device 103 and/or RDT application 107. An NR request 122 refers to a request to implement an NR transaction, which may include but are not limited to: card-not-present (CNP) transactions (e.g., CNP "createSale," "createAuth," "createCapture," and/or "create return" transactions), on-line transactions, ecommerce transactions, follow-on transactions, and/or the like. A "follow-on" transaction refers to a transaction pertaining to an existing and/or previously created transaction, such as "getSale," "updateSale," "returnSale," "voidSale," "getAuth," updateAuth," "voidAuth," "getCapture," "updateCapture," "returnCapture," "voidCapture," "getReturn," "voidReturn," and/or the like. The transaction API 136 may be configured to process transactions asynchronously; e.g., by and/or within async/await functions. In some embodiments, the transaction API 136 may further comprise and/or implement a configuration API 135, which may provide for managing a configuration, settings, and/or functionality of the transaction server 110. The configuration API 135 may enable partners to manage transaction services provided by the transaction server 110. The configuration API 135 may provide for managing respective partner configuration data 610. As used herein, partner configuration data 610 may comprise any suitable information pertaining to transaction services provided to a partner by and/or through the transaction server 110. For example, the partner configuration data may include a partner profile. Partner configuration data 610 may be maintained within non-transitory storage, such the non-transitory data store 116 of the computing system 111.

In the FIG. 6 embodiment, the transaction server 110 is further configured to support uniform, cross-platform transactions on a server partner device 102N comprising a UNIX platform 104N. The partner device 102N may not comprise a reader device 103 and/or RDT application 107. The partner device 102N may be configured to process NR transactions and, as such, may not comprise a reader device 103 and/or RDT application 107. The transaction server 110 may be configured to provide the CUI component 120 to the partner devices 102A-N, as disclosed herein. The CUI component 120 may be configured for operation on each different type of partner device 102A-N (and/or each different type of platform 104A-N). The CUI component 120 may be configured to operate within cross-platform execution environments 105A-N supported by the respective platforms 104A-N, as disclosed herein. The CUI component 120 may be configured to implement the same CUI interface 121 on each type of partner device 102A-N (and/or within each platform 104A-N).

The CUI component 120 may comprise a plurality of TPM 128A-M, including NR TPMs 128M and 128N. As used herein, an NR TPM 128 refers to a TPM 128 configured to implement and/or process requests 122 pertaining to NR transactions (transactions that do not require interaction with a platform-specific reader device 103 and/or RDT application 107). The NR TPMs 128M and 128N may be platform-independent (capable of implementing and/or processing NR requests 122 and/or transactions on each of the plurality of different types of partner devices 102AN and/or each platform 104A-N). As disclosed in further detail herein, the TPM 128M may be configured to interface with the transaction API 136 of the transaction server 110 (and/or configuration API 135). The TPM 128N may be configured to process and/or implement transactions through a transaction user interface (UI) 628. As used herein, a transaction UI 628 refers to UI elements configured for display on a partner device 102. A transaction UI 628 may be configured for display within a browser application running on a partner device 102; e.g., may comprise a Web UI, such as a Web page, form, window, iFrame, pop-out, pop-up, and/or the like. A transaction UI 628 may be embodied by electronic markup data, such as HyperText Markup Language (HTML), eXtensible Markup Language (XML) data, and/or the like. The transaction UI 628 of TPM 128N may be configured to interface with a UI API 134 of the transaction server 110. The UI API 134 may be configured to implement and/or process transactions requested through the transaction UI 628 and return corresponding transaction response data 126.

The UI API 134 may be coupled to a submit module 144 and/or UI management module 145 of the transaction server 110. The submit module 144 may be configured to implement and/or process transactions submitted through the TPM 128N and/or transaction UI 628. The submit module 144 may process NR transactions through the transaction API 136 and return corresponding transaction response data 126 to the TPM 128N and/or transaction UI 628. The UI management module 145 may be configured to manage the configuration, setup, and/or settings of UI elements associated with respective partners. Information pertaining to the UI elements may be maintained within respective partner configuration data 610. The UI management module 145 may be configured to enable partners to define, modify, and/or specify partner-specific UI elements. The partner configuration data 610 maintained for a partner may define a style and/or look-and-feel of the transaction UI 628 (and/or other UI elements). Alternatively, or in addition, the partner configuration data 610 may define a partner-specific transaction UI 628 (and/or other partner-specific UI elements).

Figure 7A:
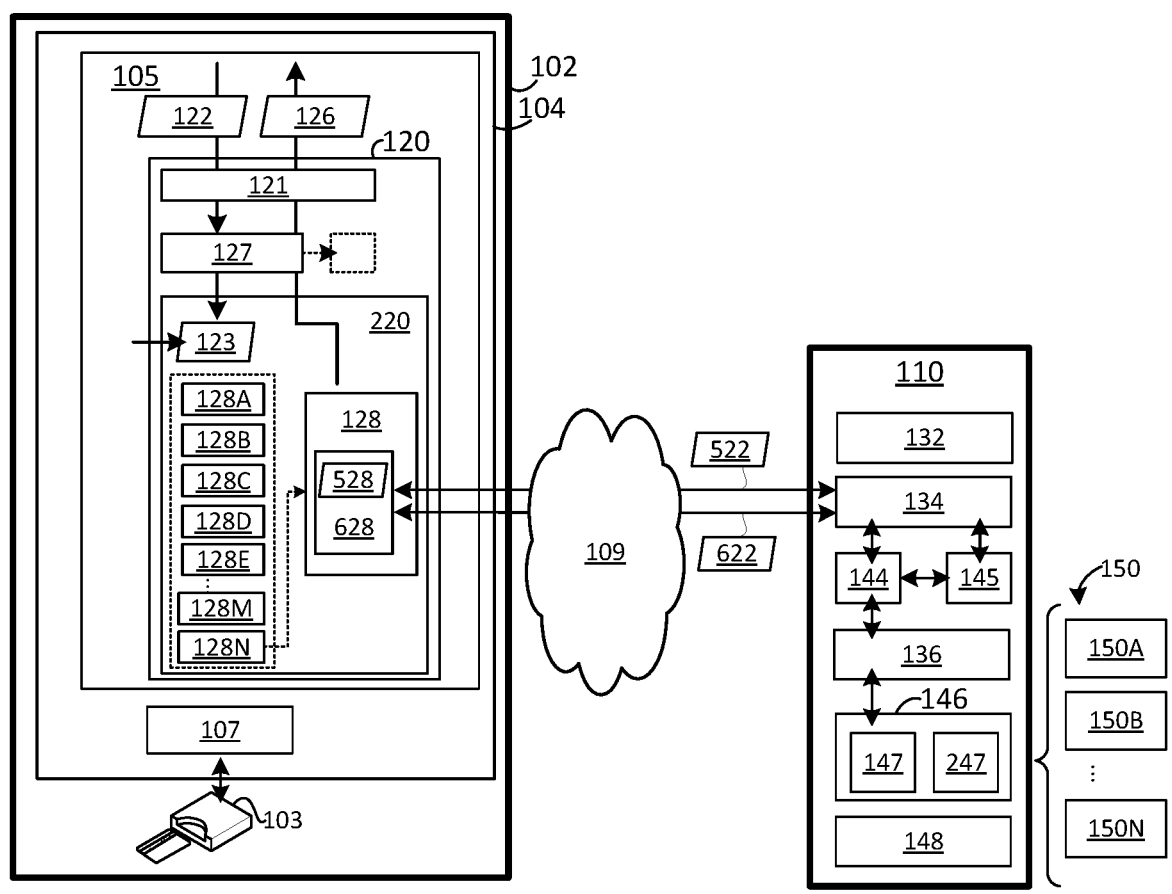
FIG. 7A is a schematic block diagram illustrating further embodiments of a cross-platform, unified integration component, as disclosed herein.

FIG. 7A is a schematic block diagram illustrating further embodiments of a CUI component 120, as disclosed herein. The CUI component 120 may be configured for operation on a plurality of different types of partner devices 102A-N and/or within a plurality of different platforms 104A-N. The CUI component 120 may be configured for operation within a cross-platform execution environment 105, such as a JavaScript execution environment of a Web application, such as a browser, or the like. In the FIG. 7A embodiment, the CUI component 120 comprises a plurality of TPM 128A-N. The TPM 128A-E may be configured to implement reader-based transactions on respective types of partner devices 102A-E (and/or respective platforms 104A-E). TPM 128M and 128N may comprise platform-independent TPM 128 configured to implement NR transactions on each of the plurality of different types of partner devices 102A-N (and/or each of the plurality of different platforms 104A-N). The TPM 128N may be configured to implement transactions through a transaction UI 628, as disclosed herein.

The CUI component 120 may further comprise a request processor 127, which may be configured to parse, interpret, extract, and/or process requests 122, request headers, and/or request payloads, as disclosed herein. The request processor 127 may be further configured to determine a transaction type of respective requests 122, which may comprise identifying requests 122 that pertain to reader-based transactions, identifying requests 122 that pertain to NR transactions, identifying requests to implement transactions through hosted interfaces, such as the disclosed transaction UI 628 (based on a "hosted_interface" header of the request 122), and/or the like.

The CUI component 120 may further comprise a CPT engine 220, which may comprise cross-platform, computer-readable instructions configured for execution on a plurality of different types of partner devices 102A-N and/or on a plurality of different platforms 104A-N. The CPT engine 220 may be configured to service requests 122 to implement transactions, as disclosed herein. Servicing a request 122 to implement a transaction may comprise the CPT engine 220: acquiring platform metadata 123, selecting a TPM 128 from the plurality of TPM 128A-N based on the acquired platform metadata 123 and/or transaction type, and processing the requested transaction in accordance with the selected TPM 128. Serving a request 122 to implement a reader-based transaction may comprise selecting an TPM 128 from TPM 128A-E, based on the acquired platform metadata 123. Servicing a request 122 to implement an NR transaction (and NR request 122) may comprise selecting one of the NR TPM 128M and 128N. The NR TPM 128 (TPM 128M and 128M) may be configured to implement NR transactions on a plurality of different types of partner devices 102A-N and/or platforms 104A-N and, as such may, therefore, be selected to service NR requests 122 regardless of the platform metadata 123 and/or regardless of whether the partner device 102 comprises a reader device 103 and/or RDT application 107.

In the FIG. 7A embodiment, the CUI component 120 is deployed on a partner device 102 that comprises a reader 103 and RDT application 107. The CUI component 120 may receive a request 122 to implement an NR transaction through the CUI interface 121. The request processor 127 may determine a transaction type of the request 122, which may comprise determining that the request 122 pertains to an NR transaction (e.g., requests implementation a CNP "createSale" transaction). The request processor 127 may further determine that the NR request 122 specifies that the NR transaction is to be implemented through the UI API 134 of the transaction server 110 (based on "hosted_interface" and/or "interface_identifier" header(s) of the request 122). The request processor 127 may be further configured to forward the request 122 to the CPT engine 220 for processing, as disclosed herein. The CPT engine 220 may select a TPM 128 to process the request 122 based on the platform metadata 123 associated with the request 122 and/or the determined request type. In the FIG. 7A embodiment, the CPT engine 220 selects TPM 128N to process the request 122 in response to determining that: a) request 122 pertains to an NR transaction (based on the determined transaction type of the request 122), and b) the "hosted_interface" request header. The CPT engine 220 may select the TPM 128N to process the NR transaction of the request 122 regardless of the type of partner device 102 and/or platform 104 on which the CUI component 120 is operating and/or regardless of whether the partner device 102 comprises a reader device 103 and/or RDT application 107.

The TPM 128N may comprise a UI TPM 128. As used herein, a UI TPM 128 refers to a TPM 128 that comprises and/or references a UI configured for display on a partner device 102. The TPM 128N may comprise and/or reference a transaction UI 628, as disclosed herein. In some embodiments, the transaction UI 628 may be hosted by the transaction server 110; markup data comprising the transaction UI 628 may be maintained within a partner configuration data 610 stored within a data store 116 of the transaction server 110. Processing the NR transaction in accordance with the TPM 128N may comprise: a) invoking the transaction UI 628, b) acquiring transaction-related information through the transaction UI 628, c) submitting a UI transaction request 622 in response to acquiring the transaction-related information, and d) receiving corresponding transaction response data 126 at the transaction UI 628. Invoking the transaction UI 628 may comprise acquiring the transaction UI 628 and/or URL of the transaction UI 628 (a UI URL 528). The transaction UI 628 and/or UI URL 528 may be acquired by, inter alia, submitting a UI request 522 to the transaction server 110 (to the UI API 134 of the transaction server 110). The UI request 522 may comprise a request to fetch a hosted interface, such as the disclosed transaction UI 628 (e.g., a "requestPayPageAPI" request, or the like). The UI request 522 may specify one or more of: a) a transaction type (e.g., "createSale," "createAuth" or the like); b) request headers (e.g., information for generating HTTP headers, such as an "Authorization" header, an "abort_controller," and/or the like); c) payload data, and so on. In some embodiments, the UI request 522 may further comprise an identifier of a UI element, such as an iFrame, pop-out window, pop-up window, and/or the like (e.g., may comprise an "interface identifier" header, as disclosed herein). The UI API 134 may return a UI URL 528 in response to the UI request 522. The UI API 134 may determine the UI URL 528 based on, inter alia, a partner profile 610 associated with the partner and/or partner device 102 (per a partner identifier included in the UI request 522). The UI API 134 may select a partner profile 610 (and/or UI URL 528) from the data store 116 based on information included in the UI request 522 (e.g., a partner identifier, platform metadata 123, transaction type, request headers, and/or the like). The UI URL 528 may refer to a partner-specific transaction UI 628 comprising partner-specific UI elements (e.g., partner specified graphics, texts, look-and-feel, and/or the like). The UI URL 528 may refer to any suitable network-accessible service including, but not limited to the transaction server 110, as disclosed herein. Invoking the transaction UI 628 may further comprise loading the transaction UI 628 from the determined URL 528 at the partner device 102. The transaction UI 628 may be loaded into a cross-platform execution environment 105 (e.g., may be loaded by a JavaScript command). Loading the transaction UI 628 may comprise causing the transaction UI 628 to be displayed at the partner device 102 (on a display device, not shown in FIG. 7A to avoid obscuring details of the illustrated embodiments). In some embodiments, the CUI component 120 may be configured to create the UI request 522, encode the request payload (stringify the payload data), initiate an asynchronous fetch request, receive the UI URL 528 in response to the request, and load the UI URL 528 (transaction UI 628) into the identified UI element. An asynchronous object may be returned (e.g., a Promise) in which an event listener is registered to receive transaction response data 126 corresponding to the UI transaction request 622.

The transaction UI 628 may be configured to acquire transaction-related information. Portions of the transaction-related information may be pre-populated from transaction-related information included in the request 122. The transaction UI 628 may comprise interactive fields and/or prompts for transaction-related information, such as transaction payment data (e.g., card number, CCD, issue date, card-holder name, card-holder address, and/or the like), transaction payee information (e.g., payee identifier, payee address, and/or the like), transaction details, transaction amount, and so on. The transaction UI 628 may be configured to submit a UI transaction request 622 to the UI API 134 in response to acquiring the transaction-related information (e.g., in response to selection of a submit control of the transaction UI 628).

Submitting the UI transaction request 622 may comprise submitting the transaction-related information acquired by the UI transaction request 622 to the UI API 134 through an HTTP POST, HTTP GET, or other suitable mechanism. The UI API 134 may be configured to process the UI transaction request 622 and return corresponding transaction response data 126 to transaction UI 628.

The UI API 134 may be configured to forward the UI transaction request 622 to the UI submit module 144, which may process the prepare the UI transaction request 622 using the transaction API 136. The UI submit module 144 may be configured to convert data of the UI transaction request 622 from a CUI format (or format used by the UI API 134 and/or transaction UI 628) to a transaction-specific format used by the transaction API 136 (a transaction API format). The transaction API 136 may be configured to process the UI transaction request 622 through the transaction gateway 146, as disclosed herein (e.g., through the DTG interface 147 of the transaction gateway 146). The transaction API 136 may be further configured to return transaction response data 126 to the transaction UI 628 (e.g., through the asynchronous Promise object and/or event listener, as disclosed above).

Figure 7B:
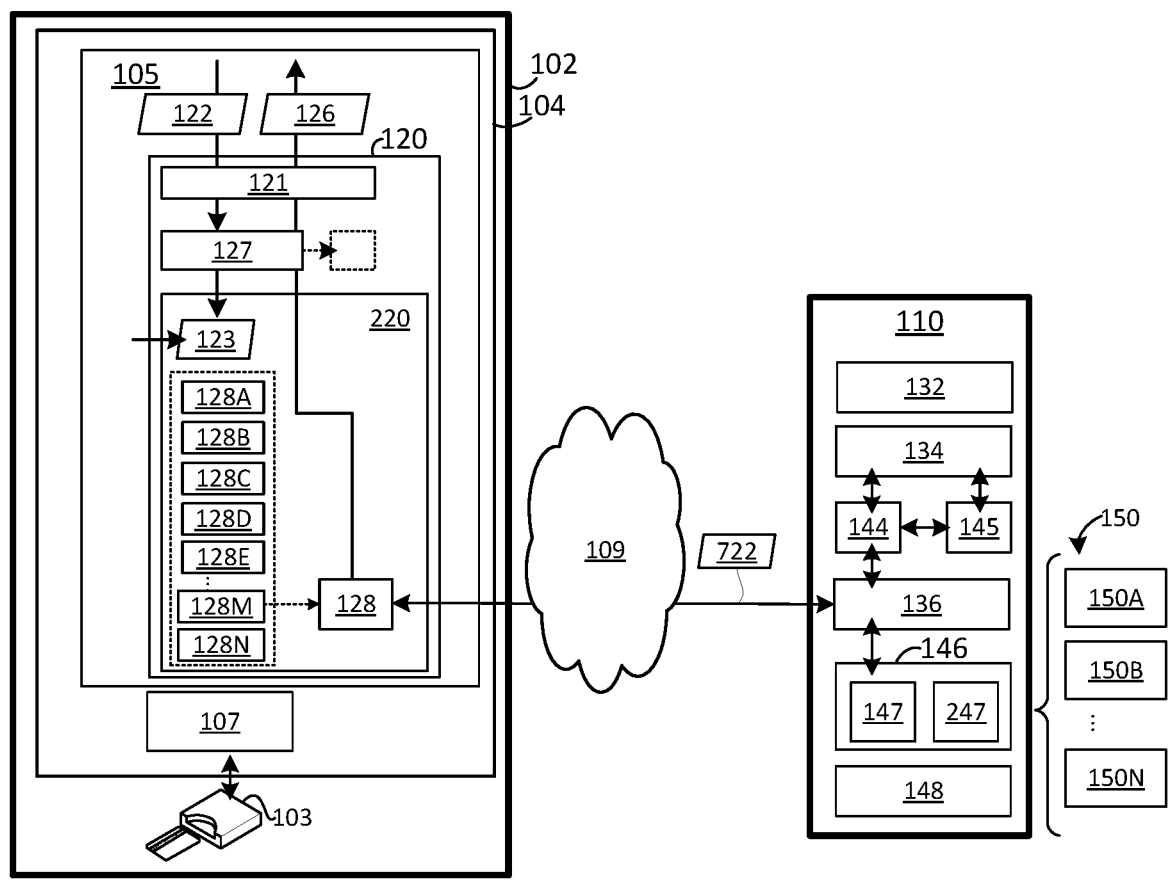
FIG. 7B is a schematic block diagram illustrating further embodiments of a cross-platform, unified integration component, as disclosed herein.

FIG. 7B is a schematic block diagram illustrating further embodiments of the disclosed CUI component 120. In the FIG. 7B embodiment, the CUI component 120 may receive a request 122 to implement a NR transaction through the transaction API 136 of the transaction server 110. The request processor 127 may determine that the request 122 pertains to an NR transaction to be processed through the transaction API 136 (as opposed to processing the NR transaction through a hosted interface, such as the transaction UI 628). The CPT engine 220 may be configured to service the request 122, as disclosed herein. The CPT engine 220 may be configured to select a TPM 128 from the plurality of TPM 128A-N. The CPT engine 220 may select TPM 128M in response to determining that: a) the request 122 pertains to an NR transaction, and b) the request 122 specifies that the NR transaction is to be performed through the transaction API 136 (e.g., the "hosted_interface" request header is "false"). The TPM 128M may be selected regardless of the platform metadata 123 and/or regardless of whether the partner device 102 comprises a reader device 103 and/or RDT application 107. The CPT engine 220 may be further configured to utilize the TPM 128M to service configuration requests 122 through the configuration API 135. As used herein, a configuration request 122 refers to a request pertaining to the configuration, settings, and/or functionality of the transaction server 110 (as opposed to a request 122 pertaining to a transaction).

Processing a request 122 pertaining to an NR transaction in accordance with the TPM 128M may comprise: forming a transaction API request 722 and submitting the transaction API request 722 directly to the transaction API 136 of the transaction server 110. In some embodiments, the processing further comprises acquiring transaction-related information through, inter alia, a partner interface (e.g., the partner application 106, not shown in FIG. 7B to avoid obscuring details of the illustrated embodiment). Forming the transaction API request 722 may comprise mapping, transforming, and/or otherwise converting data of the request 122 (and/or other transaction-related information) from a CUI format to a transaction API format (a format used by and/or compatible with the transaction API 136). The transaction API request 722 may be formed by use of the transform module 132 of the transaction server 110, as disclosed herein. The transaction API request 722 may be submitted through the electronic communication network 109 (by an HTTP POST, HTTP GET, or other suitable mechanism). The transaction API 136 may be configured to process the request through the DTG interface 147 of the transaction gateway 146 and return corresponding transaction result data 126. The transaction API 136 may be configured to process the transaction API request 722 asynchronously, as disclosed herein (e.g., through an async/await function, a Promise object and/or the like).

Figure 8:
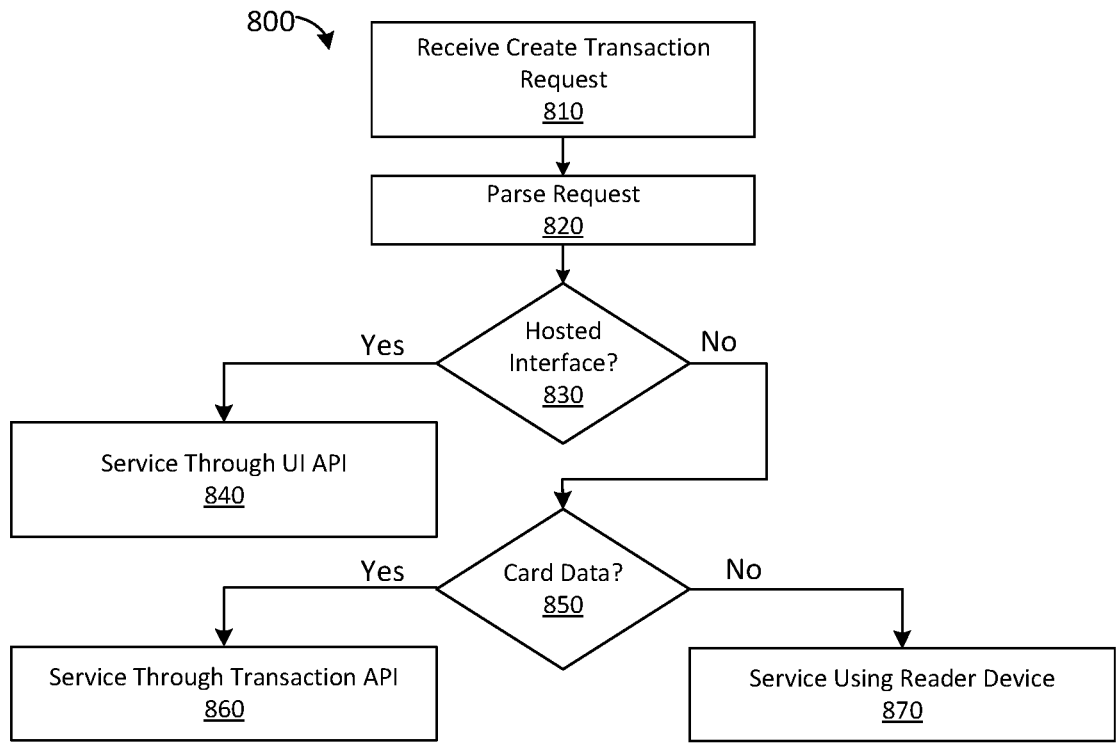
FIG. 8 is a flow diagram of one embodiment of a method for servicing uniform, cross-platform create transaction requests, as disclosed herein.

FIG. 8 is a flow diagram of one embodiment of a method 800 for servicing uniform, cross-platform create transaction requests. Step 810 may comprise receiving a request 122 to create a new transaction (e.g., a create transaction request 122). Step 810 may comprise receiving the create transaction request 122 through a CUI interface 121 of a CUI component 120. The CUI component 120 may be configured for operation on a plurality of different types of client computing devices (e.g., different types of partner devices 102A-N and/or platforms 104A-N). The CUI component 120 may be configured to present and/or implement the same CUI interface 121 on each of the plurality of different types of client computing devices. The create transaction request 122 of step 810 may be received through an exported method, function, interface, and/or API of the CUI 121, such as "createSale," "createAuth," createCapture," "createReturn," or the like. Step 810 may comprise providing the CUI component 120, hosting the CUI component 120, importing the CUI component 120 (and/or CUI interface 121), and/or the like.

Step 820 may comprise parsing the create transaction request 122 received at step 810, which may comprise parsing, extracting, interpreting, and/or otherwise processing one or more of: a request type, request headers, request flags, request parameters, request payload data, and/or the like, as disclosed herein (e.g., by a request processor 127 of the CUI component 120). Step 820 may comprise determining a requested transaction type, determining whether the request 122 is to be implemented through a hosted interface (per a "hosted_interface," "interface_identifier," and/or other request flags and/or headers), and so on.

Step 830 may comprise determining whether the create transaction request 122 specifies implementation through a hosted interface, as disclosed herein. Step 830 may comprise evaluating a "hosted_interface" header of the create transaction request 122 (as parsed at step 820). If the create transaction request 122 is determined to specify implementation through a hosted interface, the flow may continue at step 840; otherwise, the flow may continue at step 840.

Step 840 may comprise servicing the create transaction request 122 through the UI API 134 of the transaction server 110. Step 840 may comprise selecting a UI TPM 128 to service the request (e.g., selecting TPM 128N, as disclosed above). Step 840 may comprise acquiring a hosted UI (e.g., a transaction UI 6228) and/or acquiring a URL of the hosted interface (e.g., a UI URL 528). Step 840 may comprise submitting a UI request 522 to the UI API 134 (e.g., submitting a request through a "requestPayPageAPI," or the like). The UI request 522 may comprise a transaction type, request headers (e.g., an "interface_identifier," "abort_controller," "request_start_time," "transaction_timer," and/or the like), payload data, and/or the like. Step 840 may further comprise acquiring transaction-related information through the transaction UI 628, submitting a UI transaction request 622 to the UI API 134, and receiving transaction response data 126. Receiving the transaction response data 126 may comprise registering an event lister to detect message(s) returned from the UI API 134 through the transaction UI 628. Step 840 may further comprise displaying the transaction response data 126 and/or returning the transaction response data 126 in response to the create transaction request 122.

Step 850 may comprise determining whether the create transaction request 122 comprises card data (per the parsing of step 820). Step 850 may comprise determining whether the request pertains to an NR and/or CNP transaction, as disclosed above. If card data is present, the flow may continue at step 860; otherwise, the flow may continue at step 860. Step 860 comprises servicing the create transaction request 122 through the transaction API 136 of the transaction server 110, as disclosed herein. Step 860 may comprise forming a transaction API request 722 by, inter alia: using the transform module 132 to generate a transaction-specific transaction type 223, request headers 224, and/or request payload 225 (convert the create transaction request 122 from the CUI format to the transaction API format). The forming may further comprise adding headers to the transform API request 722, such as an "abort_controller," "request_start_time," "transaction_timer," and/or the like). Step 860 may further comprise submitting the transaction API request 722 to the transaction API 134 through the electronic communication network 109, receiving corresponding transaction response data 126, and returning the transform response data 126 in response to the create transaction request 122. In some embodiments, step 860 further comprises transforming the transaction response data 126 from a transaction-specific format (e.g., the transaction API format) into another format, such as the CUI format.

Step 870 may comprise servicing the create transaction request 122 by use of a reader device 103 and/or RDT application 107. Step 870 may comprise selecting a TPM 128 from a plurality of platform-specific TPM 128A-E, each configured to implement reader-based transactions on one of a plurality of different computing platform types (one of a plurality of different types of partner devices 102A-E and/or platforms 104A-E). Step 870 may comprise acquiring platform metadata 123 and/or selecting the TPM 128 in accordance with the acquired platform metadata 123, as disclosed herein. Step 870 may further comprise servicing the create transaction request 122 by use of the selected TPM 128, which may comprise: forming a device request 222, and configuring an installed RDT application 107 to process the device request 222 through a primary transaction connection 209 to the transaction server 110. Forming the device request 222 may comprise converting data of the create device request 122 from a CUI format to a transaction-specific format. The transaction-specific format may be selected in accordance with the platform metadata 123 (and/or selected TPM 128). The transaction-specific format may comprise: a mobile format, a cloud format (a non-mobile format), an iOS® format, an Android® format, a Windows® format, a MacOS® format, a LINUX format, and/or the like, as disclosed herein.

Step 870 may comprise invoking and/or interfacing with a platform-specific RDT application 107. In some embodiments, step 870 comprises configuring the platform-specific RDT application 107 to implement the device request 222 through a bi-directional interface 228 and receiving corresponding transaction response data 126 through the bi-directional interface 228. Alternatively, step 870 may comprise: establishing a secondary transaction connection 149 with the transaction server 110 (with a server module 148 of the transaction server 110), invoking the platform-specific RDT application 107 through a unidirectional interface 238 (e.g., mobile deep linking), and acquiring transaction response data 126 corresponding to the request 122 through the secondary transaction connection 149. The acquiring may comprise monitoring the secondary transaction connection 149, registering event listeners with the secondary transaction connection 149 (e.g., listeners for onopen, onmesage, onerror, onclose, and/or other events), terminating the secondary transaction connection 149 in response to receiving a message comprising the transaction response data 126 (and/or an error condition), and/or the like. Step 870 may further comprise transforming the transaction response data 126 by use of the transformation module 132 (e.g., converting from a transaction-specific format to the CUI format) and returning the transaction response data 126 in response to the request 122.

Figure 9:
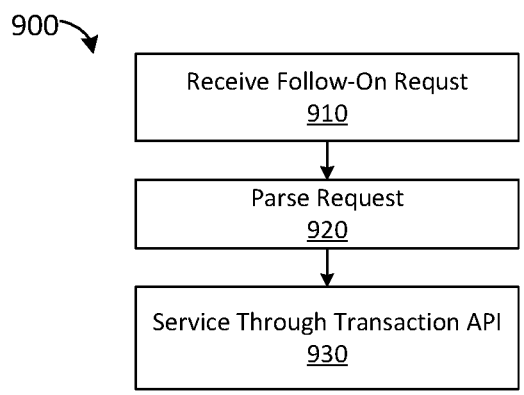
FIG. 9 is a flow diagram of one embodiment of a method for servicing uniform, cross-platform follow-on transaction requests, as disclosed herein.

FIG. 9 is a flow diagram of one embodiment of a method for servicing follow-on transactions through a uniform, cross-platform interface. Step 910 may comprise receiving a request 122 pertaining to a previously created transaction (e.g., a follow-on transaction request 122). Step 910 may comprise receiving the follow-on transaction request 122 through a CUI interface 121 of a CUI component 120. The CUI component 120 may be configured for operation on a plurality of different types of client computing devices (e.g., different types of partner devices 102A-N and/or platforms 104A-N). The CUI component 120 may be configured to present and/or implement the same CUI interface 121 on each of the plurality of different types of client computing devices. The follow-on transaction request 122 of step 910 may be received through an exported method, function, interface, and/or API of the CUI 121, such as "getSale," "updateSale," "returnSale," "voidSale," "getAuth," "updateAuth," "voidAuth," "getCapture," "updateCapture," "returnCapture," "voidCapture," "getReturn," "voidReturn," and/or the like. Step 910 may comprise providing the CUI component 120, hosting the CUI component 120, importing the CUI component 120 (and/or CUI interface 121), and/or the like.

Step 920 may comprise parsing the follow-on transaction request 122 received at step 910, which may comprise parsing, extracting, interpreting, and/or otherwise processing one or more of: a request type, request headers, request flags, request parameters, request payload data, and/or the like, as disclosed herein (e.g., by a request processor 127 of the CUI component 120). Step 920 may comprise determining a requested transaction type, determining a transaction identifier (e.g., a sale identifier, reference identifier, or the like), and so on.

Step 930 may comprise servicing the follow-on transaction request 122 through the transaction API 134 of the transaction server 110. Step 930 may comprise selecting the TPM 128M to service the follow-on transaction request 122 based on the requested transaction type determined at step 920. Step 920 may comprise selecting the TPM 128M regardless of the platform metadata 123 (e.g., regardless of the type of partner device 102A-N and/or platform 104A-N on which the CUI component 120 is operating). Step 920 may comprise forming a transaction API request 722. Step 920 may comprise transforming the follow-on transaction request 122 from a CUI format to a transaction-specific format (e.g., the transaction API format). The transforming may further comprise adding one or more headers, such as an "abort_controller," "request_start_time," "transaction_timer," and/or the like. Step 920 may further comprise issuing the transaction API request 722 to the transaction API of the transaction server 110 (through the electronic communication network 109), receiving transaction response data 126, and returning the transaction response data 126 in response to the follow-on transaction request 122.

Figure 10:
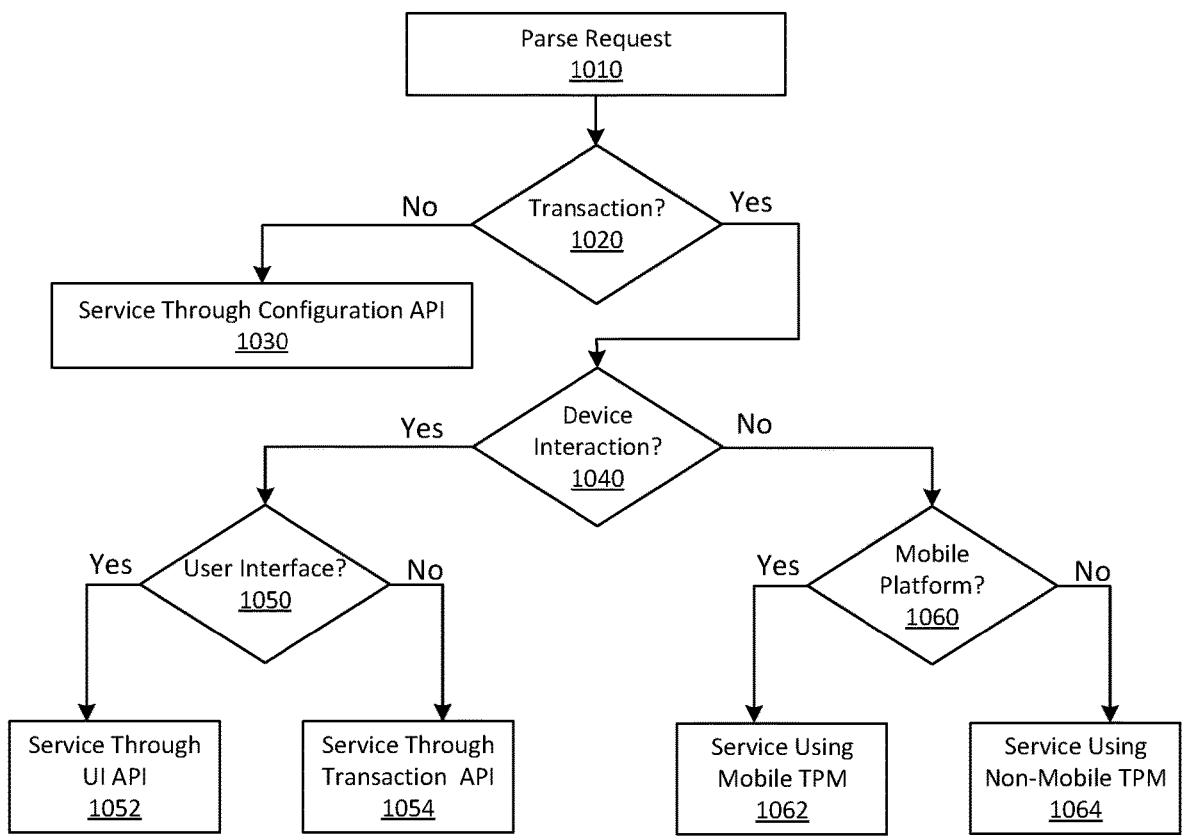
FIG. 10 is a flow diagram of another embodiment of a method for servicing requests through a uniform, cross-platform integration component, as disclosed herein.

FIG. 10 is a flow diagram of another embodiment of a method for servicing requests through a uniform, cross-platform integration component, as disclosed herein. Step 1010 may comprise parsing a request 122. Step 1010 may be performed in response to receiving the request 122 through a CUI interface 121 of a CUI component 120 operating on a client computing device (a partner device 102 and/or platform 104). Step 1010 may comprise determining a requested transaction type, parsing headers of the request, parsing a payload of the request, and/or the like. Step 1010 may comprise determining whether the request 122 pertains to a transaction, whether the transaction (if any) involves reader interaction (whether the requested transaction comprises a NR transaction), and/or the like.

Step 1020 may comprise determining whether the request pertains to a transaction. If not, the flow may continue at step 1030; otherwise, the flow may continue at 1040. Step 1030 may comprise processing the request 122 through a configuration API 135 of the transaction server 110. Step 1030 may comprise converting data of the request 122 from a CUI format to the transaction API format, as disclosed herein. Step 1030 may further comprise sending the transformed request 122 to a configuration API 135 of the transaction server 110 (through an electronic communication network 109).

Step 1040 may comprise determining whether the request 122 involves interaction with a reader device 103 and/or RDT application 107. Step 1040 may comprise determining whether the requested transaction comprises a reader-based transaction, an NR transaction, and/or the like. The determination of step 1040 may be based on the requested transaction type determined at step 1010. Step 1010 may comprise determining that the request 122 does not involve reader interaction in response to the requested transaction type comprising: a CNP transaction, a follow-on transaction, and/or the like. Step 1010 may comprise determining that the request 122 involves reader interaction in response to the requested transaction type comprising a reader-based transaction, a request to create a new transaction (without specifying reader data and/or a hosted interface), and/or the like. In response to determining that the request 122 does not involve device interaction, the flow may continue at step 1050; otherwise, the flow may continue at step 1060.

Step 1050 may comprise determining whether the request 122 involves presentation of UI elements, such as a transaction UI 628. Step 1050 may comprise determining whether the request 122 comprises transaction-related information (e.g., payment information, such as a card number, CCD, and/or the like). Alternatively, or in addition, step 1050 may comprise evaluating headers of the request 122, such as a "hosted_interface" header, "interface_identifier" header, and/or the like. In response to determining that the request involves UI presentation, the flow may continue at step 1052; otherwise, the flow may continue at step 1054.

Step 1054 may comprise processing the request 122 through a transaction UI 628. Step 1054 may comprise selecting a UI TPM 128 to process the request 122 (TPM 128N), forming a UI request 522, and interfacing with the UI API 134 of the transaction server 110, as disclosed herein. Step 1054 may further comprise acquiring transaction response data 126 through the transaction UI 628 and/or returning the transaction response data 126 in response to the request 122.

Step 1054 may comprise serving the request 122 through the transaction API 136 of the transaction server 110. Step 1054 may comprise generating a transaction API request 722, submitting the transaction API request 722 to the transaction API 136, and receiving transaction response data 126. The transaction API request 722 may be generated by, inter alia, converting data of the request 122 (e.g., the requested transaction type, headers, and/or payload) from a CUI format to a transaction API format. The transaction API request 722 may be generated by a transform module 132 of the transaction server 110. The transform module 132 may be configured to define additional request headers, such as an "abort_controller," "request_start_time." "transaction_timer," and/or the like. Step 1054 may further comprise returning the transaction response data 126 in response to the request 122.

Step 1060 may comprise determining whether the request 122 was issued on a mobile platform (and/or the CUI component 120 at which the request 122 was received is operating on a mobile partner device 102 and/or within a mobile platform 104). Step 1060 may comprise evaluating platform metadata 123 associated the request 122, as disclosed herein. In response to determining that the request 122 was issued on a mobile platform, the flow may continue at step 1062; otherwise, the flow may continue at step 1064.

Step 1062 may comprise servicing the request using a mobile TPM 128. Step 1062 may comprise selecting a mobile TPM 128 from a plurality of mobile TPM (e.g., selecting a TPM 128 from TPM 128A-B). Step 1062 may comprise selecting one of: TPM 128A configured for iOS® mobile platforms 104A, TPM 128B configured to Android® mobile platforms 104B, and/or the like. The selecting of step 1062 may be based on the platform metadata 123 acquired at step 1060. Step 1062 may further comprise servicing the request using the selected mobile TPM 128, which may comprise: a) generating a device request 222 in accordance with the mobile TPM 128; b) establishing a secondary transaction connection 149 to the transaction server 110 (in association with a transaction-specific identifier 249); c) configuring a RDT application 107 installed on the mobile platform 104 to process the device request 222 through a primary transaction connection 209 to the transaction gateway 146 of the transaction server 110 through a unidirectional interface 238; and d) acquiring transaction response data 126 through the secondary transaction connection 149. Step 1062 may further comprise monitoring the secondary transaction connection 149 and/or terminating the secondary transaction connection 149 in response to receiving the transaction response data 126 (and/or detecting an error condition). Step 1062 may include returning the transaction response data 126 in response to the request 122, as disclosed herein. The returning may include converting the transaction response data 126 from a transaction-specific format (a mobile format) to a CUI format.

Step 1064 may comprise servicing the request using a non-mobile TPM 128. Step 1064 may comprise selecting the non-mobile TPM 128 from a plurality of non-mobile TPM 128 (e.g., selecting the TPM 128 from TPM 128A-E). The selecting of step 1064 may be based on the platform metadata 123 acquired at step 1060. Step 1064 may comprise: a) generating a device request 222 in accordance with the non-mobile TPM 128, b) configuring a RDT application 107 installed on the non-mobile platform 104 to process the device request 122 through a bi-directional interface 228, and c) receiving corresponding transaction response data 126 through the bi-directional interface 228. Step 1064 may include returning the transaction response data 126 in response to the request 122, as disclosed herein. The returning may include converting the transaction response data 126 from a transaction-specific format (a non-mobile format) to a CUI format.

Figure 11:
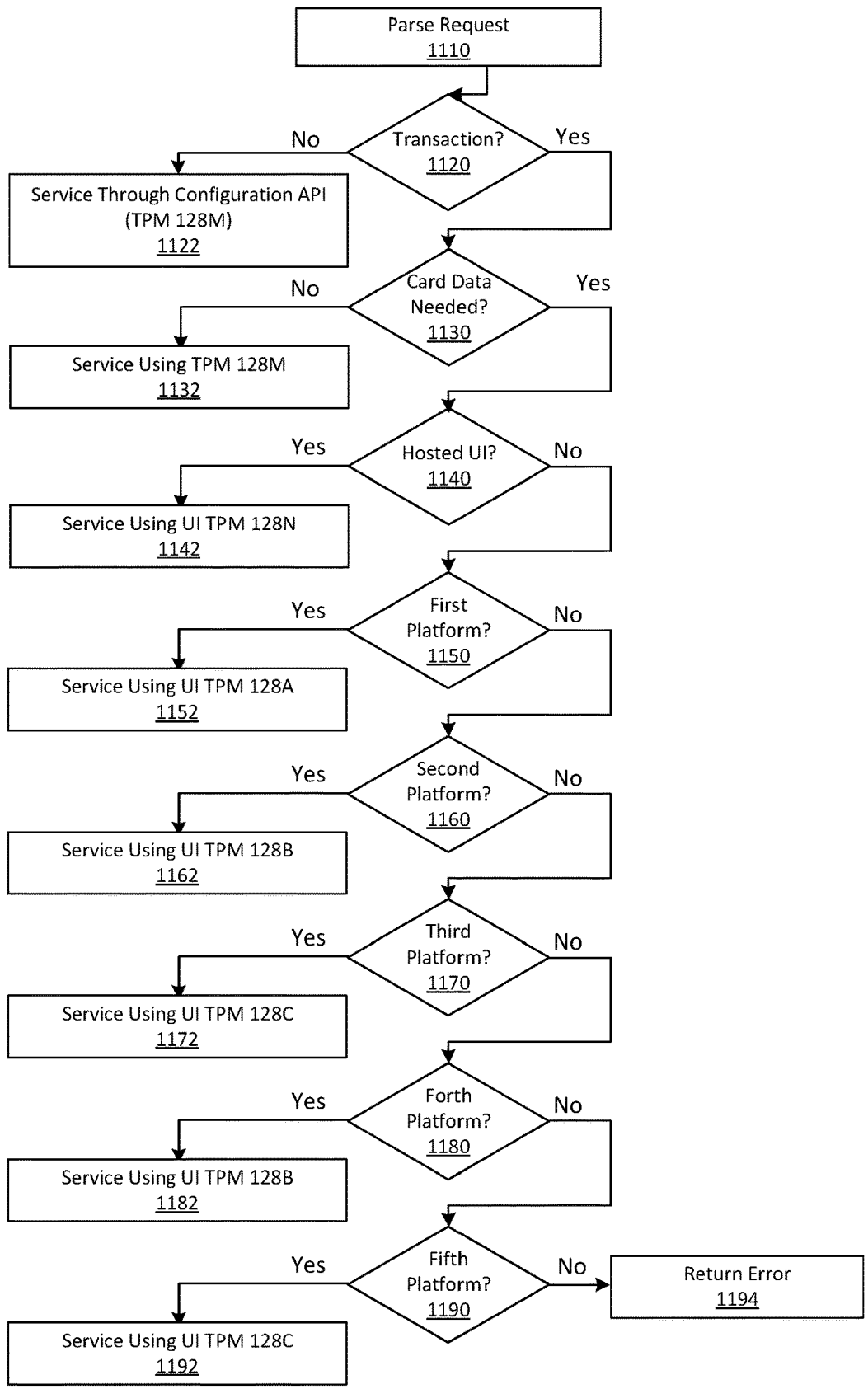
FIG. 11 is a flow diagram of another embodiment of a method for servicing requests through a uniform, cross-platform integration component, as disclosed herein.

FIG. 11 is a flow diagram of another embodiment of a method for servicing requests through a uniform, cross-platform integration component, as disclosed herein. Step 1110 may comprise parsing a request 122 received through a CUI interface 121 of a CUI component 120 operating on a computing device (e.g., a partner device 102 and/or platform 104). Step 1110 may comprise determining a requested transaction type of the request 122. Step 1110 may further comprise parsing one or more request headers (e.g., parsing an "Authorization" header, a "hosted_interface" header, an "interface_identifier," header, and/or the like). Step 1110 may further comprise parsing payload data of the request 122, as disclosed herein. Step 1120 may comprise determining whether the request 122 pertains to a transaction (based on the determined requested transaction type). If the request 122 pertains to a transaction the flow may continue at step 1130; otherwise, the flow may continue at step 1122. Step 1122 may comprise servicing the request 122 through the configuration API 135 of the transaction server 110 (by use of the TPM 128M).

Step 1130 may comprise determining whether card data are needed in order to process the transaction of the request. The determination of step 1130 may be based on the requested transaction type, headers, and/or payload parsed at step 1110. Step 1130 may comprise determining that card data are not required in response to determining that the request 122 pertains to a follow-on transaction and/or that card data is included in the request 122 payload. If card data are not needed, the flow may continue at step 1132; otherwise, the flow may continue at step 1140. Step 1132 may comprise servicing the request 122 through the transaction API 136 of the transaction server 110 (by use of the TPM 128M), as disclosed herein. Step 1132 may comprise deriving a transaction API request 722 from data of the request 122 (using the translation module 132), submitting the transaction API request 722 to the transaction API 136, and returning corresponding transaction response data 126, as disclosed herein.

Step 1140 may comprise determining whether the request 122 is to be performed through a hosted UI. The determination of step 1140 may be based on evaluation of one or more request headers, such as a "hosted_interface" header, "interface_identifier" header, and/or the like. If the requested transaction is to be implemented through a hosted interface, the flow may continue at step 1142; otherwise, the flow may continue at step 1150. Step 1142 may comprise servicing the request 122 using the UI TPM 128N, as disclosed herein. Step 1142 may comprise: generating a UI request 522, using the UI request 522 to load a transaction UI 628 through the UI API 134 (invoking a "requestPayPageUI" method of the UI API 134), receiving transaction response data 126 through the transaction UI 628 (through an asynchronous object registered to a UI element of the transaction UI 628), as disclosed herein.

Step 1150 may comprise determining whether the CUI component 120 is operating on a first platform (e.g., an iOS® platform 104A). If so, the flow may continue at step 1152; otherwise, the flow may continue at step 1160. Step 1152 may comprise servicing the request 122 by use of an iOS® TPM 128A, as disclosed herein.

Step 1160 may comprise determining whether the CUI component 120 is operating on a second platform (e.g., an Android® platform 104B). If so, the flow may continue at step 1162; otherwise, the flow may continue at step 1170. Step 1162 may comprise servicing the request 122 by use of an Android® TPM 128B, as disclosed herein.

Step 1170 may comprise determining whether the CUI component 120 is operating on a third platform (e.g., a Windows® platform 104C). If so, the flow may continue at step 1172; otherwise, the flow may continue at step 1180. Step 1172 may comprise servicing the request 122 by use of a Windows® TPM 128C, as disclosed herein.

Step 1180 may comprise determining whether the CUI component 120 is operating on a fourth platform (e.g., a MacOS® platform 104D). If so, the flow may continue at step 1182; otherwise, the flow may continue at step 1190. Step 1192 may comprise servicing the request 122 by use of a MacOS® TPM 128D, as disclosed herein.

Step 1190 may comprise determining whether the CUI component 120 is operating on a fifth platform (e.g., a LINUX platform 104E). If so, the flow may continue at step 1192; otherwise, the flow may continue at step 1194. Step 1192 may comprise servicing the request 122 by use of a LINUX TPM 128E, as disclosed herein. Step 1194 may comprise returning an error indication in response to the request 122.

Example Embodiment

Figure 12:
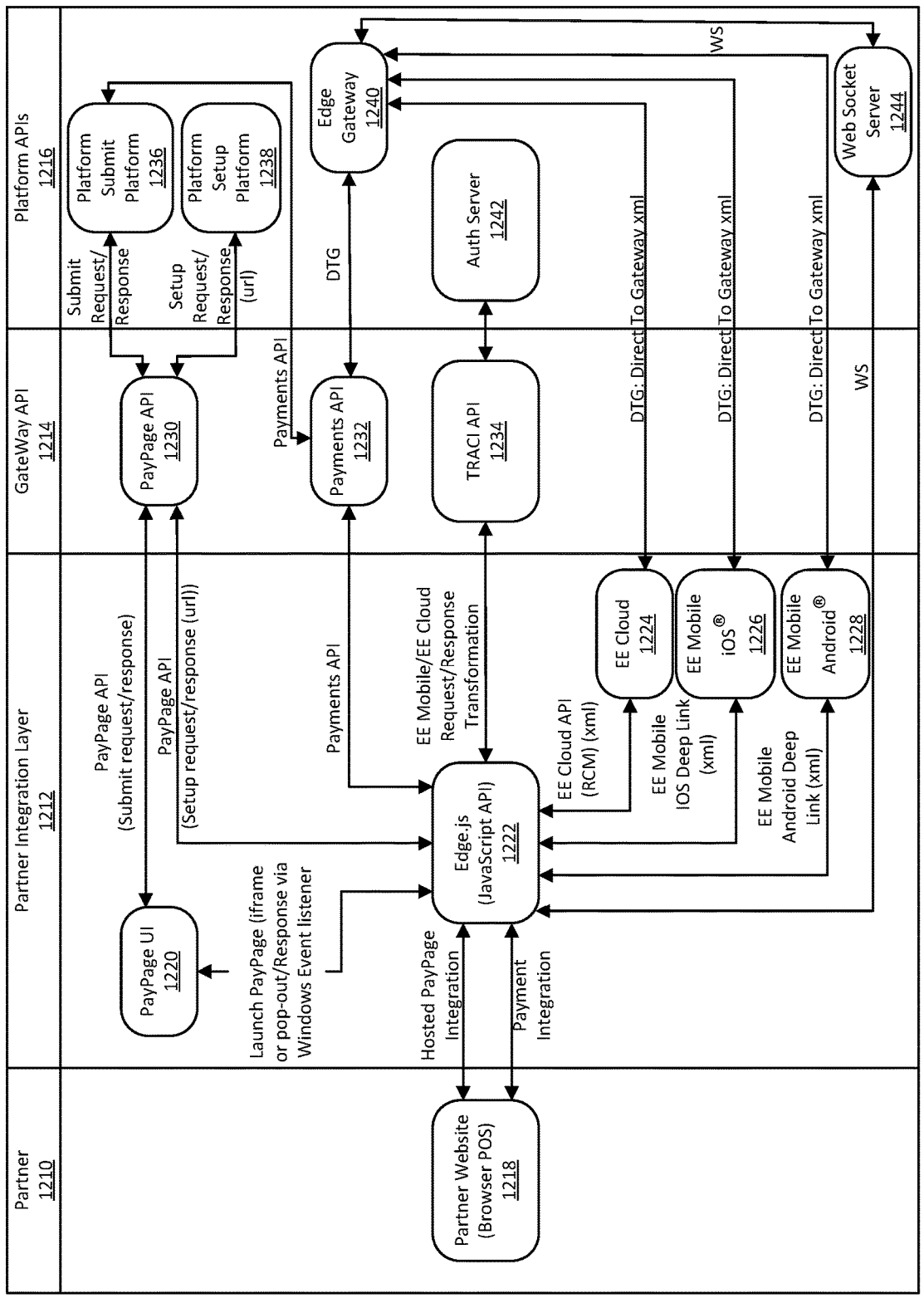
FIG. 12 is a block diagram illustrates a high level integration for cross-platform transactions, as disclosed herein.

By way of example, FIG. 12 illustrates a high level integration diagram for cross-platform transactions according to one embodiment. In this example, integration is described for a partner 1210, partner integration layer 1212, gateway API 1214 (e.g., APIGEE® or other gateway API), and platform APIs 1216. The partner 1210 may be associated with a partner website 1218 (e.g., browser POS). As discussed below, the partner integration layer 1212 may include a PayPage UI 1220, an Edge.js 1222 (JavaScript API), an EE Cloud 1224, an EE Mobile iOS®, and an EE Mobile Android®. The gateway API 1214 may include a PayPage API 1230, a Payments API 1232, and a TRACI API 1234. The platform APIs may include a Platform Submit Platform 1236, a Platform Setup Platform 1238, an Edge Gateway 1240, an Authentication (Auth) Server 1242, and a Web Socket Server 1244.

In the illustrated example, Edge.js 1222 is a common JavaScript library that provides a unified integration method to browser based POS applications that is platform and operating system agnostic for processing both card present and card not present payment transactions.

Web based POS applications today need separate integrations for each platform/operating system. Merchant partners have different technology stacks meaning partner's web based POS software can be run on Windows®, macOS®, iOS® or Android® devices, and this requires partners to develop specific integration for the disparate platforms with the payment provider (e.g., OpenEdge®).

The use of different integration libraries for each platform and/or operating system increases the integration overhead for partners. Also, supporting different versions of the integration library/API is inefficient, time-consuming, and error-prone and adds complexity.

Edge.js 1222 is a cross-platform library/API that supports different technology platforms and operating systems. This provides partners with a single integration which is platform and operating system agnostic. Edge.js 1222 first inspects and determines the partner platform on which the browser based application is running, and then invokes the right set of platform specific OpenEdge® payment APIs to interact with the card reader device and process the payment transaction. The complexity and integration overhead for cross-platform payment processing is completely abstracted and made seamless to the partner.

Edge.js 1222 provides supported features such as processes following payment transaction types initiated from a web based POS application, which may include one or more of (1) Card Present payment transaction running on an iOS terminal connected to a POS card reader device; (2) Card Present payment transaction running on an android terminal connected to a POS card reader device; (3) Card Present payment transaction running on a Windows terminal connected to a POS card reader device; (4) Card Present payment transaction running on a macOS® terminal connected to a POS card reader device; and/or (5) Card Not Present transactions processed via manual card entry (keyed or keyboard emulator entry) on a hosted web based payment form, that is launched within an iframe or in a separate pop out page.

In order to integrate Edge.js 1222 with partner web site, the partner imports Edge.js 1222 library in their JavaScript file, for example, using ES2015 (ES6) module syntax: import edgeJs from 'https://edgejs.paygateway.com/dist/edge.js'. Then, the partner can access methods such as (see more below):

```
Edge.js.createSale(requestHeader, requestPayload).then(...);
//OR
Edge.js['createSale'](requestHeader, requestPayload).then(...);
```

Alternatively, the partner can use dynamic import, such as:

```
import('https://Edge.js.paygateway.com/dist/edge.js').then((Edge.js) => {
// Work with library here, for example:
```

```
Edge.js.createSale(requestHeader, requestPayload).then(...);
//OR
Edge.js['createSale'](requestHeader, requestPayload).then(...);
});
```

Edge.js 1222 library may provide one or more of the following payment methods:
createSale—Create a sales transaction.
getSale—Retrieve a sales transaction.
updateSale—Update a sales transaction.
returnSale—Create a returns transaction associated with a prior sale.
voidSale—Void a sales transaction.
createAuth—Create an authorizations transaction.
getAuth—Retrieve an authorizations transaction.
updateAuth—Update an authorizations transaction.
captureAuth—Capture an authorizations transaction.
voidAuth—Void an authorizations transaction.
createCapture—Create an offline captures transaction.
getCapture—Retrieve a captures transaction.
updateCapture—Update a captures transaction.
returnCapture—Create a returns transaction associated with a prior capture.
voidCapture—Void a captures transaction.
createReturn—Create an independent returns transaction.
getReturn—Retrieve a returns transaction.
voidReturn—Void a returns transaction.

For Edge.js 1222 properties, according to certain embodiments, there is only one property, where the current version of the library is stored: version—console.log (Edge.js.version).

To perform any transaction, the client invokes a request to Edge.js 1222 with two parameters: headers of the transaction request; and body of the transaction request. For example:

```
Edge.js[$transactionType](requestHeader, requestPayload)
    .then(responsePayload => {
        // work with the transaction response here
    }, errorResponse => {
        // handle errors which might occur during the transaction. Keep in mind that
errors might also be returned as a result of resolved promise if library performed correctly,
but transaction was not successful.
    });
    // alternatively, use '.finally' method to catch both types of responses, but mind
browser support.
```

Promise returned by the method will be resolved when the status of the transaction will be obtained, and it means that there will be no other updates from Edge.js 1222 for that transaction.

Headers of the transaction request (e.g., a JavaScript object) include these properties:

```
{
    authToken: "EXPAMPLE_AUTH_TOKEN", // AuthToken obtained as described by
OpenEdge Auth Token documentation
    requestId: "UNIQUE_REQUEST_ID", // Unique request id, client to generate truly
unique ID for example UUID
    hostedPayPage: true/false, // If transaction needs to be completed using hosted pay
page, set this to 'true'
    iframeId: iframeId, // If hosted pay page is set to true earlier and the page needs to
be rendered in an iFrame instead of popup window, provide the id of the iFrame on your
page
    debugMode: true // Defaulted to false, but if 'true' is provided, will enable console
log messages and dev information in browser console for easier debugging.
}
```

The body of the transaction request provides a payload as a JavaScript Object or as a JSON string.

In an example embodiment, the library is built as an ES2015 module, meaning that it uses new syntax for importing and exporting its functions and properties. The library may rely heavily on new capabilities of modern JS standards, so knowledge of ES2015, ES2016 and ES2017 may be recommended before working with the codebase. A user may understand, for example, how async\await, arrow functions, promises, let\const variables and spread operators are working prior to any modifications. There are four types of entities: internal functions, exported functions (methods), internal variables and exported variables (properties).

Only functions and properties designed for partner use are exported, such as transaction types and library version.

All internal functions start with '_', and all internal variables are contained inside 'Edge.js' object as its properties.

An example method for creating new transaction (createSale, createAuth, createCapture, createReturn) includes:
1. Merchant calls transaction function;
2. Transaction function parses request headers provided by client (see 'Parsing request headers');
3. Transaction function parses request body transforming it from JSON string to JS object, if needed (see 'Helper functions')'
4. If hostedPayPage property of header is set to true, transaction is proceeded via Hosted PayPage API (see 'PayPage API');
5. If card data is provided as a part of transaction payload:
    TRACI prepares the payload body and headers (see TRACI API')
    Add_abortController to headers returned by TRACI so we could do centralized abort later if needed
    Call Payments API with headers and payload prepared by TRACI (see 'Payments API')
    Transform Payments API response via TRACI (see 'TRACI API')
    Return transformed response to the merchant (see 'Helper functions')
6. If card data is not provided, use Device to complete transaction
    First, transform merchant request to the format understandable by device (see 'Device flow')
    Then, send the request to the device (see 'Device flow')
    Once device response if received, transform it to final (Edge.js 1222) format (see 'Device flow')
    Return transformed response to the merchant (see 'Helper functions').

An example method for performing follow-on transactions (get*, update*, return*, void*) includes:
1. Partner calls transaction function;
2. Transaction function parses request headers provided by client (see 'Parsing request headers');
3. Transaction function parses request body transforming it from JSON string to JS object, if needed (see 'Helper functions');
4. If hostedPayPage property of header is set to true, return an error (unexpectedHostedPayPageError). Follow-on transactions do not need card data and hence should never use hostedPayPage.
5. If sale_id OR reference_id are provided as a part of transaction payload:
    Traci api prepares the payload body and headers (see 'Traci API')
    add_abortController to headers returned by traci so we could do centralized abort later if needed
    call payments API with headers and payload prepared by traci (see 'Payments API')
    transform payments API response via traci (see 'Traci API')
    return transformed response to the partner (see 'Helper functions')
6. If both sale_id and reference_id are provided, returns error (_twoIdsProvidedError).

An example for parsing request headers (_parseRequestHeaders) includes parsing function checks if all necessary parameters are provided by merchant and also adds a few internal headers to work with down the line:
_abortController—to be able to stop fetch calls if they needed to be aborted
_requestStartTime—the timestamp of transaction start in order to be able to abort transaction if it takes too much time
_transactionTimer—actual timer which counts time passed from the beginning of transaction, used to abort all pending fetch requests if transaction takes too long.

For the PayPageAPI (_requestPayPageAPI):_requestPayPageAPI is async\await function used to obtain a url of the Hosted Pay Page from PayPage API and display it as an iFrame or Popup. It also sets up window-level event listener to catch the message from the Hosted Pay Page with the results of the transaction. Different transactions use slightly different headers, thus the function takes the following arguments:
'transactionType'—a type of requested transaction, e.g. 'createSale' or 'createAuth'
'headers'—an object, containing information used to generate HTTP headers, like 'Authorization'. Also includes reference to application-wide abortController
'data'-payload, needed to be sent with the request, will be attached to body of the request. If needed, will be stringified.

The flow of the function: it takes arguments described above, creates request URL, stringifies payload and starts async fetch request. If it is successful, it will get the url from the response, use it to show an iFrame (iFrame ID should be provided by partner) or Popup. Then, it will return the Promise, inside of which window event listener is set up. Once message event arrives, promise will be resolved with it's data. Otherwise error will be returned.

Traci API (_requestTraci):_requestTraci is async\await function used to conduct server-side data transformation requests for different formats of transaction requests and responses. Different transactions require slightly different headers, thus function needs to take following arguments:
'transactionType'—a type of requested transaction, e.g. 'createSale', 'getSale' or 'voidSale',
'from'—the format of incoming data, can be 'edge_js', 'payments_api', 'EECloud', 'EEMobile'
'to'—the format of the response data expected, can be 'edge_js', 'payments_api', 'EECloud', 'EEMobile'
'headers'—an object, containing information used to generate HTTP headers, like 'X-GP-Request-Id' or 'Authorization'. Also includes reference to application-wide abortController.
'payload'—data, needed to be sent with the request, will be attached to body of the request. If needed, will be stringified.

The flow of the function: it takes arguments described above, creates request URL, if needed, stringifies payload and starts async fetch request. If it is successful, will resolve the response in JSON format, if not—will return an error to the merchant.

Payments API (_requestPaymentsAPI):_requestPaymentsAPI is async\await function used to conduct server-side requests for any kind of transaction. Different transactions require slightly different headers, thus function needs to take following arguments:

- 'transactionType', —the keyword or set of keywords to be attached to Payments API base URL, e.g. 'sales' or 'sales/*SALE_ID*/returns'
- 'headers', —an object, containing information used to generate HTTP headers, like 'X-GP-Request-Id' or 'Authorization'. Also includes reference to application-wide abortController.
- 'payload', —data, needed to be sent with the request, will be attached to body of the request if needed (see below)
- 'method'—http request method, defaulted to 'POST' because most of transactions are done via 'POST'. Also, if method is different from 'GET', payload provided will be attached to request as a 'body'

The flow of the function-based on its arguments, it constructs fetch request parameters object with 'method', 'mode', 'headers', and 'signal'. The 'headers' are now proper HTTP headers, and 'signal' is a parameter used to abort fetch request if needed. Then it will check the method and add body to the request parameters, if needed. Next, it will perform an async fetch request and based on the outcome will throw an error or return obtained data to the calling function.

Device flow (_prepareDeviceRequest, _invokeDevice, _prepareDeviceResponse). Device flow has 3 functions: _prepareDeviceRequest, _invokeDevice, _prepareDeviceResponse.

- _prepareDeviceRequest—it accepts 'transactionType', 'headers' and 'payload'. Then it checks what OS we are working with and depending on that it will convert data using Traci API either to EECloud data format or EEMobile. There is an additional check if '_desktopDeviceEnabled' constant is set to true to make sure RCM transactions are allowed at this time.
- _invokeDevice—async function; with the data returned by '_prepareDeviceRequest' function, '_invokeDevice' will either send a fetch request to local RCM server (for desktop OS) or will start WebSocket based transaction flow (see 'WebSocket flow'). Regardless of the route, it will return response (in the format provided by device) back to the flow whether it is success or error.
- _prepareDeviceResponse—similar to '_prepareDeviceRequest', this function will use Traci API to convert device response back from device format ('EECloud' or 'EEMobile', depending on OS) to 'EdgeAPI'.

WebSocket flow. WebSocket flow is used for processing transaction through a mobile device. Mobile transaction is initiated via deep linking into Open Edge mobile app installed on the device. The mobile app cannot send the transaction response back to Edge.js 1222 via the deep link interface since it is unidirectional. So in order to get the response, Edge.js 1222 uses a web socket server. It opens a web socket connection, and once the transaction response is made available to the web socket server, it is sent back to Edge.js 1222 via this connection.

Brief overview of the flow:_requestWSTransaction: get an XML data, parse it, obtain 'orderId', 'transactionType', 'terminalId' and 'platformToken'. for follow-on transactions use 'REFERENCEORDERID' instead of 'ORDERID'. Based on this data, 'webSocketRequestMessage' and 'webSocketUrl' will be created. 'webSocketUrl' is created based on 'edgeJs._wsBaseUrl', 'requestId' and 'platformToken'. requestId is a combination of 'orderId', 'terminalId' and current 'timestamp'. Then WebSocket connection will be established.

_establishWebSocketConnection:
1. Opens WebSocket Connection;
2. Monitors presence of the internet connection (window.onoffline);
3. Sets up event listeners for WS lifecycle: onopen, onmessage, onerror, onclose;
4. Performs connection termination if abort signal is emitted.
5. Uses '_generateEdgeExpressXmlError4Response', '_generateEdgeExpressXml2Response', '_generateEdgeExpressXmlError12Response' functions to generate XML response for scenarios when no proper XML received from the server.

WS Messages: First message which is supposed to arrive from WS server is 'HTTP Authentication Succeeded'. Only after that we use mobile deep linking to send data to iOS or Android app, as well as sending transaction data to the WS server. After that we listen for another WS message, which should have transaction response and thus can be returned to the device flow for further transformation.

Helper functions (_generateRequestId, _prepareResponsePayload, _getOS, _parseJSON, _logger):

1. _generateRequestId—generates random requestId for upcoming transaction. Format: 'EJS-xxxxxxxx-xxxx-4xxx-yxxx-xxxxxxxxxxxx' where x is a random number (see OE documentation for details);
2. _prepareResponsePayload—the mail aim of that function is to transform the response from the string to JSON (if needed), log the operation and return the response in the way it should be delivered to the partner;
3. _getOS—based on userAgent and appVersion returns current OS: 'Unknown OS', 'Windows', 'MacOS', 'UNIX', 'Linux', 'Android' or 'IOS';
4. _parseJSON—wrapper around native 'JSON.parse' function for proper handling of cases when the object provided is not parsable;
5. _logger—wrapper around native console.log function which allows logs to be easily turned on and off based on 'debugger' parameter. Also allows to create console log groups and colored text messages.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the claims.

What is claimed is:

1. A computer-implemented method for servicing transaction requests, comprising:
    providing a client library configured for operation on a plurality of different types of client computing devices, the client library configured to provide a same transaction interface on each client computing device of the plurality of different types of client computing devices; and
    servicing transaction requests received through the client library, the transaction requests having a cross-platform format and received from different types of client computing devices via the same transaction interface, wherein servicing a transaction request comprises:
        determining a platform type of the client computing device corresponding to the received transaction request,
        selecting an implementation module at the client computing device based on the determined platform type, the implementation module selected from a plurality of implementation modules, each implementation module configured to implement a first type of transaction on a respective one of the plurality of different types of client computing devices,
        converting the received transaction request from the cross-platform format to a platform-specific format corresponding to the implementation module and a platform-specific transaction application at the client computing device, and
        executing, using the selected implementation module and a platform-specific invocation process, the platform-specific transaction application at the client computing device to generate a transaction response using the converted transaction request, the transaction response having the platform-specific format; and
        converting the transaction response from the platform-specific format to the cross-platform format to complete the transaction.

2. The method of claim 1, further comprising:
    configuring a card-reader to process the transaction through a primary connection with a transaction server;
    establishing a secondary connection with the transaction server; and
    acquiring transaction response data through the secondary connection.

3. The method of claim 1, wherein the client library is configured for operation within a runtime environment of the client computing device.

4. The method of claim 1, wherein the client library is configured for operation within a JavaScript runtime environment.

5. The method of claim 1, wherein the client library is configured for operation within a runtime environment managed by one or more of an operating system, a browser application, a hypervisor, and a virtual machine monitor of the client computing device.

6. The method of claim 1, wherein selecting the implementation module comprises:
    selecting a first implementation module in response to the client computing device corresponding to a first platform;
    selecting a second implementation module in response to the client computing device corresponding to a second platform; and
    selecting a third implementation module in response to the client computing device corresponding to a third platform.

7. The method of claim 6, wherein the first platform is a mobile platform and the third platform is a non-mobile platform.

8. The method of claim 1, wherein selecting the implementation module comprises selecting a card-not-present implementation module in response to the determined transaction type comprising a card-not-present transaction.

9. The method of claim 8, wherein selecting the implementation module comprises selecting the card-not-present implementation module in response to the determined platform type corresponding to one of an iOS platform, Android platform, and a Windows platform.

10. The method of claim 1, further comprising:
transmitting electronic markup data to the client computing device, the electronic markup data comprising a form configured to prompt a user to enter electronic data pertaining to the transaction; and
obtaining electronic transaction data in response to submission of the form.

11. The method of claim 10, further comprising:
determining a partner corresponding to the transaction request;
retrieving customization metadata corresponding to the determined partner; and
generating the electronic markup data in accordance with the retrieved customization metadata.

12. A non-transitory computer-readable storage medium, the computer-readable storage medium including instructions that when executed by a computer, cause the computer to:
provide a client library configured for operation on a plurality of different types of client computing devices, the client library configured to provide a same transaction interface on each client computing device of the plurality of different types of client computing devices; and
service transaction requests received through the client library, the transaction requests having a cross-platform format and received from the plurality of different types of client computing devices via the same transaction interface, wherein servicing a transaction request comprises:
determining a platform type of the client computing device corresponding to the received transaction request;
selecting an implementation module at the client computing device based on the determined platform type, the implementation module selected from a plurality of implementation modules, each implementation module configured to implement a first type of transaction on a respective one of the plurality of different types of client computing devices;
converting the received transaction request from the cross-platform format to a platform-specific format corresponding to the implementation module and a platform-specific transaction application at the client computing device; and
executing, using the selected implementation module and a platform-specific invocation process, the platform-specific transaction application at the client computing device to generate a transaction response using the converted transaction request, the transaction response having the platform-specific format; and
converting the transaction response from the platform-specific format to the cross-platform format to complete the transaction.

13. The computer-readable storage medium of claim 12, wherein the instructions, when executed by the computer, further cause the computer to:
configure a card-reader to process the transaction through a primary connection with a transaction server;
establish a secondary connection with the transaction server; and
acquire transaction response data through the secondary connection.

14. The computer-readable storage medium of claim 12, wherein the client library is configured for operation within a JavaScript runtime environment.

15. The computer-readable storage medium of claim 12, wherein the client library is configured for operation within a runtime environment managed by one or more of an operating system, a browser application, a hypervisor, and a virtual machine monitor of the client computing device.

16. The computer-readable storage medium of claim 12, wherein selecting the implementation module comprises:
selecting a first implementation module in response to the client computing device corresponding to a first platform;
selecting a second implementation module in response to the client computing device corresponding to a second platform; and
selecting a third implementation module in response to the client computing device corresponding to a third platform.

17. The computer-readable storage medium of claim 16, wherein the first platform is a mobile platform and the third platform is a non-mobile platform.

18. The computer-readable storage medium of claim 12, wherein selecting the implementation module comprises selecting a card-not-present implementation module in response to the determined transition type comprising a card-not-present transaction.

19. The computer-readable storage medium of claim 18, wherein selecting the implementation module comprises selecting the card-not-present implementation module in response to the determined platform type corresponding to one of an iOS platform, Android platform, and a Windows platform.

20. The computer-readable storage medium of claim 12, wherein the instructions, when executed by the computer, further cause the computer to:
transmit electronic markup data to the client computing device, the electronic markup data comprising a form configured to prompt a user to enter electronic data pertaining to the transaction; and
obtain electronic transaction data in response to submission of the form.

21. The computer-readable storage medium of claim 20, wherein the instructions, when executed by the computer, further cause the computer to:
determine a partner corresponding to the transaction request;
retrieve customization metadata corresponding to the determined partner; and
generate the electronic markup data in accordance with the retrieved customization metadata.

* * * * *